(12) United States Patent
Kennedy et al.

(10) Patent No.: US 6,512,056 B1
(45) Date of Patent: Jan. 28, 2003

(54) STAR POLYMERS HAVING STATISTICAL POLY(ISOBUTYLENE-CO-STYRENE) COPOLYMER ARMS

(75) Inventors: Joseph A. Kennedy, Akron, OH (US); Diana L. Hull, Lausanne (CH)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 09/802,338

(22) Filed: Mar. 9, 2001

(51) Int. Cl.⁷ .............................................. C08L 53/02
(52) U.S. Cl. ........................ 525/314; 525/316; 525/244; 525/98
(58) Field of Search ................................ 525/314, 316, 525/244, 98

(56) References Cited

U.S. PATENT DOCUMENTS

| | | | |
|---|---|---|---|
| 5,032,653 A | * | 7/1991 | Cheradame et al. |
| 5,395,885 A | | 3/1995 | Kennedy et al. ............... 525/98 |
| 5,804,664 A | | 9/1998 | Kennedy et al. ............. 525/314 |
| 5,844,056 A | | 12/1998 | Kennedy et al. ......... 526/348.7 |

OTHER PUBLICATIONS

J. Phys. Org. Chem., 8, 258 (1995), Orszagh et al.
J. Polym. Sci., Polym. Chem. Ed., 3 2455 (1965), Okamura et al.

* cited by examiner

Primary Examiner—James J. Seidleck
Assistant Examiner—Olga Asinovsky
(74) Attorney, Agent, or Firm—Renner, Kenner, Greive, Bobak, Taylor & Weber

(57) ABSTRACT

The synthesis and characterization of star copolymers by living carbocationic copolymerization of statistical polymers comprising monomers of isobutylene (IB) and another monomer selected from the group consisting of styrene, isoprene and living carbocationically copolymerizable derivatives thereof is described. The poly(isobutylene-co-styrene) arms emanate from a calix[n]arene core where n preferably equals 8, forming an multi(octa)-arm star. The arms are advantageously fitted with crosslinkable termini such as allyl or hydroxyl end groups. The hydroxyl-terminated arm star copolymers are particularly suitable for use in coatings when reacted with crosslinking agents such as isocyanates.

10 Claims, 12 Drawing Sheets

STAR POLYMERS HAVING STATISTICAL POLY(ISOBUTYLENE-CO-STYRENE) COPOLYMER ARMS

The research disclosed in this application was at least partially supported by a grant from the National Science Foundation, and therefore, the U.S. government may have certain rights to this invention.

TECHNICAL FIELD

This invention relates to star polymers and, more particularly, to the carbocationic polymerization of functionalizable copolymer arms emanating from a calixarene core to form the star polymers. Specifically, this invention relates to the synthesis of star polymers by living carbocationic copolymerization of statistical polymers comprising monomers of isobutylene (IB) and one or more other monomers selected from the group consisting of styrene, isoprene and carbocationically copolymerizable derivatives thereof. The star polymers are particularly suitable for use in coatings when reacted with crosslinking agents such as isocyanates.

BACKGROUND OF THE INVENTION

The synthesis of various multi-arm radial or star polymers has grown in both practical and theoretical interest in a variety of industries. More particularly, the synthesis of well-defined star polymers having a readily determinable, definite number of arms have become increasingly more important over the years. Such star polymers are useful as, inter alia, surfactants, lubricants, rheology modifiers, viscosity modifiers, control agents, coatings and sealants.

There has been a growing interest in star polymers comprising multiple polyisobutylene (PIB) arms. For example, Kennedy et al. U.S. Pat. No. 5,395,885 describes the synthesis of star polymers having multiple PIB arms and polydivinylbenzene (PDVB) cores using cationic, "arm-first", synthesis techniques. Because the structure of polyisobutylene is readily characterized and contains no unsaturation, these PIB-based stars are believed to be useful for a variety of applications such as motor oil additives and viscosity index improvers. The PDVB cores, however, were not "well defined", meaning that the core of the star polymer, e.g., PDVB, was an uncontrolled, crosslinked, gel-like structure having unsaturation sites in the core.

Consequently, further studies done by Kennedy provided for multiple PIB arms radiating from "well-defined" cores which were built of readily characterizable, soluble molecules which are precursors to the core. As a result, the structure of the resultant star polymers having well-defined cores were able to be controlled. Included within this group of "well-defined" cores was calixarenes. Kennedy et al. U.S. Pat. No. 5,844,056 describes the synthesis and characterization of star polymers having multiple, well-defined PIB arms emanating from a calixarene core. The synthesis was accomplished by the use of multifunctional calixarene derivative initiators which, in conjunction with certain Friedel-Crafts acids that acted like co-initiators, induced the living (carbocationic) polymerization of isobutylene.

Other Kennedy patents resulted from similar (yet different) synthesis techniques which resulted in star polymers of multiple PIB arms emanating from different well-defined cores. An example of these different cores included polysiloxane cores.

Once these star polymers were produced, other applications for star polymers were revealed. In at least one instance, production of novel thermoplastic elastomers (TPEs) became of interest. Consequently, star-polymers having poly(isobutylene-block-styrene) arms emanating from a calixarene core were synthesized. These star polymers became the subject of Kennedy U.S. Pat. No. 5,804,664. While these star polymers were suitable for their intented use, other applications and physical characteristics have now become of interest as discussed hereinbelow.

It is well known that living and quasi living polymerizations proceed in the absence of chain transfer and termination. By extending this definition, it is expected that living copolymerizations can occur in the absence of these chain-breaking reactions. In view of the inherent complexity of copolymerizations, however, it is far more difficult to achieve living copolymerizations than living homopolymerizations of a single monomer. This difficulty arises because copolymerizations involve at least two monomers whose reactivities are necessarily different, and because the complexity of the mechanisms of chain-breaking reactions escalates in the presence of two monomers.

Relatively few attempts have even been made at living carbocationic copolymerization. Orszagh et al. *J. Phys. Org. Chem.*, 8, 258 (1995) have investigated the living carbocationic copolymerization of the isobutylene/p-methyl styrene system. As with homopolymerizations, these workers showed the absence of chain transfer to monomer in copolymerization by linearly ascending $M_n$ versus conversion plots and corresponding horizontal N (number of polymer molecules) versus conversion plots. Further, the absence of termination was demonstrated by linear first order in monomer rate plots.

Some 35 years ago, Okamura et al., *J. Polym. Sci. Polym. Chem. Ed.*, 3, 2455 (1965), investigated statistical IB/St copolymerizations mediated by $TiCl_4$ and found that this system exhibited an azeotropic composition at 21/79 mol/mol IB/St. The effect of conversions on copolymerization compositions and $M_n$ however, was not studied. Moreover, there has never been any suggestion for the production of such copolymers for use in star polymer synthesis.

To that end, the synthesis of star polymers with a range of glass transition temperatures (Tgs) has continued to be a significant challenge to polymer scientists and engineers. The production of a star polymer having copolymer arms whose Tg can be controlled between the Tgs of the polymers from which the copolymer arms are produced, and whose termini are fitted with crosslinkable endgroups, e.g., allyl, hydroxyl, etc., are of particular interest. Preferably, the production of a star polymer having multiple statistical poly(isobutylene-co-styrene) arms whose Tg can be "tuned" between about −73° C. to about +100° C. i.e., between the Tgs of polyisobutylene and polystyrene, respectively, are desired. Control of the length (i.e., number average molecular weight, Mn) of the copolymer arms is also desired.

SUMMARY OF INVENTION

It is therefore, an aspect of the present invention to provide a star polymer having multiple, statistical copolymer arms emanating from a calixarene core.

It is another aspect of the present invention to provide a star polymer, as above, wherein the Tg of the copolymer arms can be "tuned" or controlled between the Tgs of the polymers from which the copolymer was produced.

It is yet another aspect of the present invention to provide a star polymer, as above, wherein the termini of the copolymer arms are fitted with crosslinkable endgroups.

It is still another aspect of the present invention to provide a star polymer, as above, wherein the number average molecular weight of the copolymer arms can be controlled.

It is a further aspect of the present invention to provide a coating comprising a crosslinking agent and the star polymer above.

At least one or more of the foregoing aspects, together with the advantages thereof over the known art relating to star polymers and coatings, which shall become apparent from the specification that follows, are accomplished by the invention as hereinafter described and claimed.

In general the present invention provides a star polymer comprising a calix[n]arene core where n=4 to 16; and N number of arms of a statistical copolymer comprising monomers of isobutylene and a different, carbocationically copolymerizable monomer selected from the group consisting of styrene and carbocationically copolymerizable derivatives thereof, and isoprene and carbocationically copolymerizable derivatives thereof, connected to the calix[n]arene core, wherein N=n.

The present invention further provides a coating comprising the reaction product of at least one crosslinking agent and a star polymer containing a calixarene core and a plurality of poly(isobutylene-co-styrene) statistical copolymer arms, each arm having a functional end group that can be crosslinked by the at least one crosslinking agent, such that the star polymer is bound to itself or another star polymer.

PREFERRED EMBODIMENT FOR CARRYING OUT THE INVENTION

Figure 1:
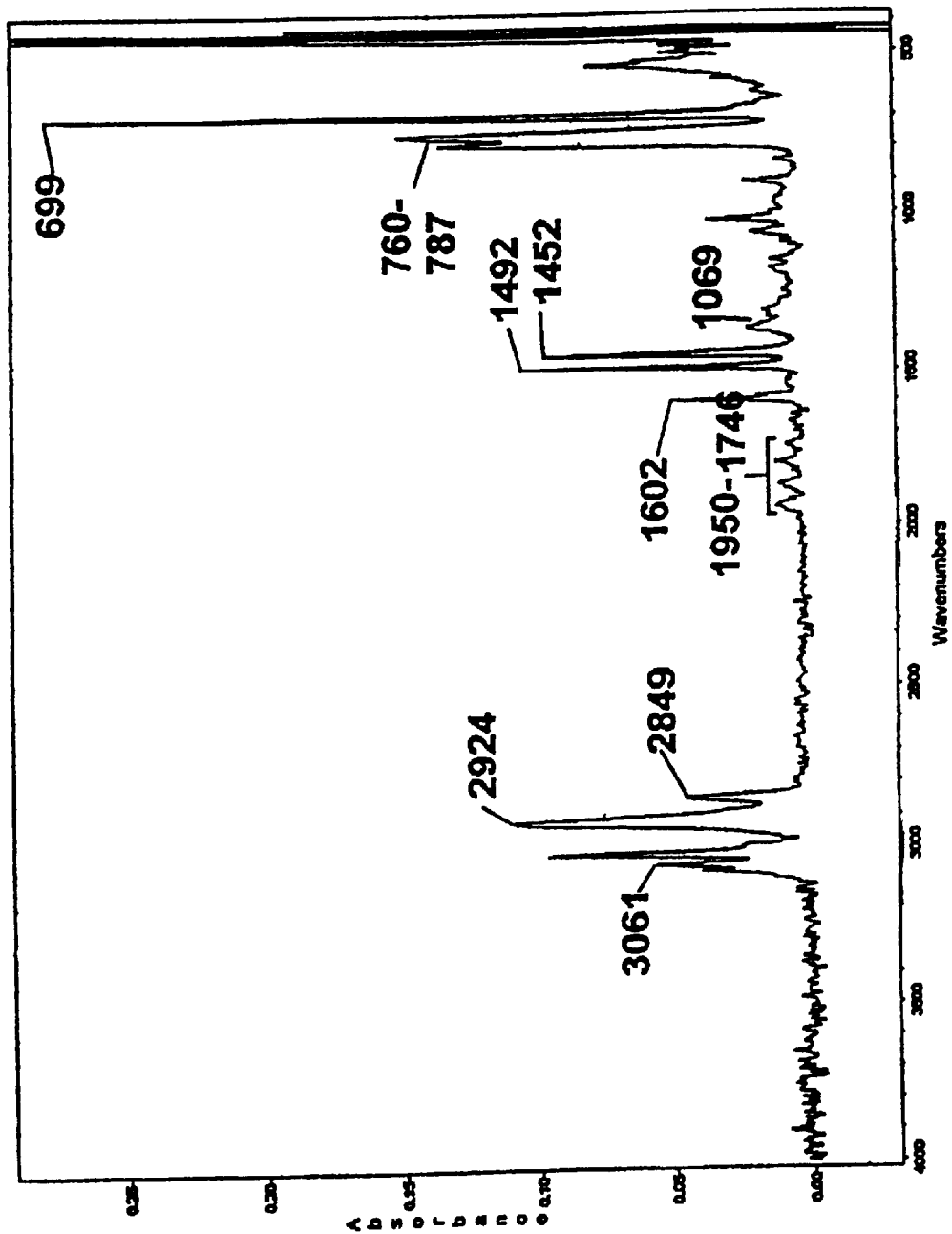
FIG. 1 is a FTIR spectrum of a representative statistical poly(isobutylene-aze-styrene) copolymer.

Broadly, the present invention is directed toward the production or synthesis of a series of novel compositions of matter, each having a structure comprising a first component, referred to hereinafter as a "core", comprising a calixarene, connected to a plurality of second components, referred to hereinafter as "arms", comprising statistical copolymers wherein one segment of the copolymer comprises an isobutylene monomer and a second segment of the copolymer includes a different cationic polymerizable monomer such as, for example, styrene, isoprene and their carbocationically copolymerizable derivatives (such as the p-halostyrenes and the p-alkylstyrenes),to provide a star polymer. It will be appreciated that since calixarene is the core, the composition will have a plurality of polymer arms, actually more than two arms, radially extending therefrom. Hence, the term "star polymer" is used to describe these multi-arm types of compositions.

The synthesis of these compositions of matter, i.e., star polymers, has been accomplished by mixing the isobutylene/styrene monomer charges with calixarene in methyl chloride, methyl cyclohexane, and/or similar solvent. Living carbocationic polymerizations can be initiated by the addition of a Friedel Crafts acid, e.g., BCl$_3$, with a known electron donor (e.g., dimethylacetamide (DMA)) and a proton trap (e.g., 2,5-di-tertbutylpyridine (DtBP)). If necessary, additional solvent (e.g., methyl chloride, methyl cyclohexane) can be added to bring the solvent ratio to an appropriate level. Another Friedel Crafts acid, e.g., TiCl$_4$, can then be introduced and the reactor can be cooled and agitated. To quench or terminate the polymerization, a terminating agent may be added. A more detailed description of a similar procedure in the production of polyisobutylene star polymers is set forth in Chen, C., J. Si, and J. Kennedy, "Living Carbocationic Polymerization. XLIX. Two-Stage Living Polymerization of Isobutylene to Di-tert-Chlorine Telechelic Polyisobutylene", J. M. S.-Pure Appl. Chem., A29(8), 669 (1992), the disclosure of which is incorporated herein by reference.

In the present invention, it has been found that the use of calixarene and at least one Friedel-Crafts acid such as, for example, BCl$_3$, TiCl$_4$, and mixtures thereof, in the presence of carbocationically polymerizable monomers such as isobutylene and styrene, and in at least one solvent at cryogenic temperature and in the presence of an electron pair donor and a proton scavenger produces the desired polymer composition, namely a star polymer having a calixarene core and poly(isobutylene-co-styrene) statistical copolymer arms emanating from the calixarene core. The synthesis of the star polymer is more particularly shown herein in Scheme I.

Scheme I

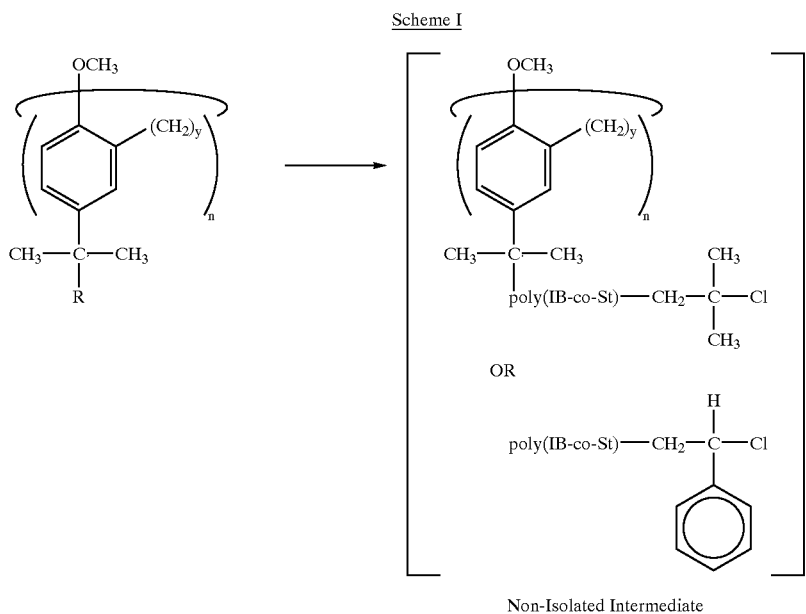

Non-Isolated Intermediate

Allylation:

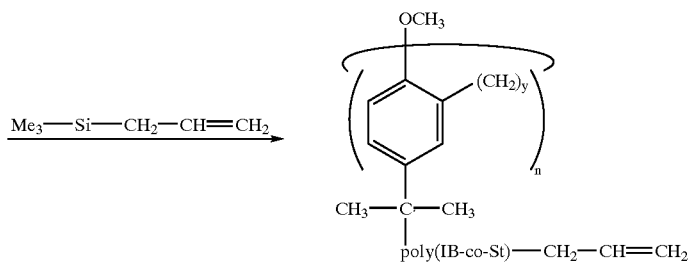

Hydroboration/Oxidation:

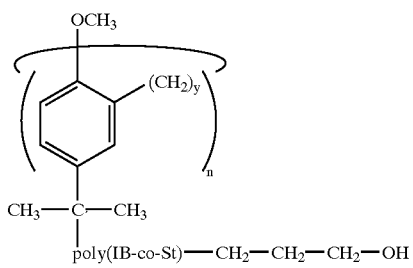

It will be appreciated that a calixarene derivative is a multifunctional initiator for the reaction and a plurality of arms equal to the number of functional sites on the calixarene may extend from the core. Thus, where calixarene derivatives are used as initiators, the number of arms, N, will depend upon the number of aromatic units, n, in the calixarene product since each aromatic unit has one functional site. It is conventional in the art to refer to the number of aromatic units and, thus, the number of functional sites on a calixarene by denoting the product as calix[n]arene where n equals the number of aromatic units.

In the present invention, the tert-methoxy, tert-hydroxy, and tert-Cl derivatives of calix[n]arenes where n=4 to 16 are preferably used as multifunctional initiators. That is, the multifunctional initiators suitable for use according to the concepts of the present invention are preferably the tert-methoxy, tert-hydroxy, and tert-Cl derivatives of wherein y=1, n=4 to 16, and R is selected from the group —OCH$_3$, —OH, and —Cl. The tert-methoxy, tert-hydroxy, and tert-Cl derivatives of calix[n]arenes where n=6 to 16 are more preferred and, in the most preferred embodiment, those derivatives of calix[8]arene are used. Of the three specified derivatives, the tert-methoxy derivative is used preferentially because it is soluble in polymerization charges (CH$_3$Cl/hexanes) at −80° C. Examples of preferred multifunctional (octafunctional) initiators suitable for use in the present invention are the tert-methoxy, tert- hydroxy, and tert-Cl derivatives of 5,11,17,23,29,35,41,47-octaacetyl-49, 50,51,52,53,54,55,56-octamethoxycaix[8]arene, namely 5,11,17,23,29,35,41,47-(2-hydroxypropyl)-49,50,51,52,53, 54,55,56-octamethoxycalix[8]arene and 5,11,17,23,29,35, 41,47-(2-methoxypropyl)-49,50,51,52,53,54,55,56-octamethoxycalix [8]arene.

It is these derivatives, in conjunction with at least one Freidel-Crafts acid, which have been found to be uniquely successful in inducing the living (carbocationic) polymerization of monomers like isobutylene and styrene to produce novel compositions such as star polymers having multiple statistical poly(isobutylene-co-styrene) copolymer arms emanating from well-defined calixarene cores.

With respect to co-initiators, at least one Friedel-Crafts acid may be used as a co-initiator in the polymerization process, and any known Friedel-Crafts acid suitable as a co-initiator for carrying out the polymerization reaction may be used in the present invention. Although both BCl$_3$ and TiCl$_4$ are believed satisfactory when used alone under certain reaction conditions, polymerization is especially satisfactory in the presence of BCl$_3$ and TiCl$_4$, and well-defined stars having close to theoretical composition and molecular weights can be obtained. Especially preferred is the use of BCl$_3$ first and then TiCl$_4$ in a two-stage process, discussed hereinabove.

With respect to suitable monomers, one of the monomers must be isobutylene. The other may be any carbocationically polymerizable monomer. Examples of such monomers include isoprene and styrene as well as derivatives of these monomers, such as, for example, p-chlorostyrene or α-methylstyrene. It is well known that isobutylene, upon carbocationic polymerization in the presence of a multifunctional calixarene initiator and a Friedel-Crafts acid as co-initiator, forms multiple polyisobutylene arms emanating from a calixarene core. It will be appreciated, however, that isobutylene and other monomers, e.g., isoprene and styrene, will provide useful statistical copolymers, where the monomers are added together to the calixarene derivative and polymerization is initiated. In the instance of isobutylene and styrene, it will be appreciated that, upon living carbocationic copolymerization of both monomers, poly (isobutylene-co-styrene) statistical copolymers are formed. Any cationic polymerizable monomer sufficiently reactive to polymerize by the same mechanism as isobutylene may be used to form the statistical copolymer. For example, derivatives of styrene and isoprene, are also particularly suitable for this purpose. Such derivatives include the p-halostyrenes such as p-chlorostyrene or -fluorostyrene, the -alkylstyrenes such as p-methylstyrene, α-methylstyrene and indene. Other potentially useful monomers include β-pinene and norbomene.

Furthermore, at least one solvent should be used in the synthesis. Such a solvent should be capable of solublizing the initiator, the Friedel-Crafts acid, and the monomers as well as the polymer. However, the solvent should not be capable of undergoing polymerization itself during the formation of the polymer. Thus, certain solvents such as THF are specifically excluded. Examples of exemplary solvents suitable for use in the present invention include but are not necessarily limited to the chlorinated alkanes, CH$_2$Cl$_2$, hexanes, carbon dioxide, and mixtures thereof, with CH$_3$Cl being preferred under certain conditions.

The polymerization reaction is further carried out in the presence of an electron pair donor and a proton scavenger. Any known electron pair donor and proton scavenger suitable for use with the other constituents of the polymerization process as described herein may be used. Among the preferred electron pair donor suitable for use are, inter alia, dimethylacetamide (DMA), dimethyl sulfoxide (DMSO), dimethylphthalate (DMP), pyridine and its derivatives, and triethylamine (TEA), with DMA being most preferred. Examples of proton scavengers include 2,5-di-tert-butylpyridine (DtBP) and it methyl derivatives, with DTBP being most preferred.

It will be appreciated that, throughout this application, the statistical copolymer arms may be referred to as isobutylene/ styrene statistical copolymers or poly(isobutylene-co-styrene) arms, but that isobutylene may be used with more than just styrene. Other carbocationically polymerizable monomers such as isoprene or any of their suitable known derivatives may be used in alternative to styrene or its derivatives, in forming the statistical copolymers. The monomers may be used in practically any mol ratio, ranging from 1/99 mol/mol isobutylene/styrene to 99/1 mol/mol isobutylene/styrene. Preferred molar ratios may depend upon several factors, including but not limited to, the ease of experimentation as noted with the use of azeotropic copolymerizations set forth hereinbelow.

More particularly, with respect to the preparation of the statistical copolymer arms, the monomers employed may be isobutylene and another monomer other than isobutylene suitable for undergoing carbocationic polymerization. Examples of such monomers include styrene, isoprene and derivatives of each of these. It will be appreciated that statistical copolymers are not block copolymers. That is, statistical copolymers are formed by reacting two or more monomers with an initiator. Importantly, however, both monomers must be sufficiently reactive to polymerize by the same mechanism, e.g., carbocationic polymerization. If one monomer were much more reactive than the other, the more reactive monomer would polymerize first, and then the second. This results in the formation of blocky statistical copolymers. Both monomers are characterized by their reactivity ratios. Statistical copolymers include random copolymers as a subset.

One of the important aspects of statistical copolymers is that they provide for copolymer arms whose glass transition temperature (Tg) can be controlled. The control or "tuning" of these arms are seen as desirable in the coating and sealant industries. More particularly, it is desired that the statistical copolymers which will ultimately form the arms of the star polymer be capable of being "tuned" to a Tg between the Tg of polyisobutylene and the Tg of the polymer formed by the other monomer used. When the other monomer is styrene, the Tg should be between about −73° C., the Tg of polyisobutylene, and about +100° C., the Tg of polystyrene. When the other monomer is α-methylstyrene, the Tg should be between about −73° C. and about +172° C., the Tg of poly(α-methylstyrene).

In order to avoid the laborious synthesis of a large number of isobutylene/styrene (IB/St) statistical copolymers and to determine whether the concepts of the present invention could be reduced to practice, an azeotropic IB/St copolymer was prepared. This azeotropic copolymer is a unique statistical copolymer, the composition of which is identical to that of the copolymerization feed.

Azeotropic copolymerizations are far superior to statistical copolymerizations for small-scale laboratory investigations because of two reasons. First, by the use of azeotropic feed compositions, large quantities of compositionally homogeneous copolymers can be prepared at essentially any conversion level, even in batch systems. In contrast, non-azeotropic batch copolymerizations yield compositionally homogeneous copolymers only at infinitesimally low conversion (or by continuously feeding the more reactive comonomer to the charge to maintain initial relative monomer concentrations as the copolymerization progresses). Second, azeotropic copolymerizations are known models for statistical copolymerizations in general. Thus, if conditions for living azeotropic IB/St copolymerizations could be developed, then it would be expected that the same conditions could be achieved with statistical IB/St copolymerizations.

Thus, preparatory to the synthesis of the target stars (the subject of Example 2 hereinbelow), the azeotropic composition of the IB/St monomer pair and, additionally, conditions for the living azeotropic copolymerization of the IB/St system were developed. Example 1 demonstrates that sufficient amounts of compositionally homogeneous P(IB-aze-St)s can be prepared in small scale batch experiments for characterization research and for testing.

EXAMPLE 1

1. Materials

Methyl chloride (Praxair) was dried by passing the gas through a column packed with a mixture of anhydrous $CaSO_4$, Drierite, molecular sieves, and powdery BaO (all from Aldrich). Methylcyclohexane (MeCy) was rendered olefin free by refluxing over $H_2SO_4$ for one week under dry $N_2$. The solvent was washed with $H_2O$, dried over $MgSO_4$ overnight and distilled over $CaH_2$ under $N_2$. The inhibitor was removed from styrene (Aldrich) by stirring with 5% NaOH, separating, and running through a short column of dry silica gel, then distilled under vacuum over $CaH_2$. The isobutylene monomer was purified as known in the art. $CDCl_3$, $TiCl_4$, dimethylacetamide (DMA), di-tert-butylpyridine (DtBP) (Aldrich) and $BCl_3$ (Linde Specialty Gases) were used as received. The synthesis of cumyl chloride is well known in the art.

2. Equipment

Molecular weights were determined by using a Waters high pressure Gel Permeation Chromatography instrument with dual UV/RI detectors. Glass transitions Tg's were determined with a Texas Instrument 2910 Differential Scanning Calorimeter at 10° C./min in nitrogen from −25° C. to 150° C. Heat decomposition was investigated by a HiRes TGA 2950 Thermal Gravimetric Analyzer (Texas Instruments) at 10° C./min from room temperature to 250° C. in air. Nuclear magnetic resonance spectra were obtained with a 300 mHz Germini instrument. Infrared spectra were generated by an ATI Mattson FTIR instrument at 4 $cm^{-1}$ resolution.

3. Procedures

Copolymerizations were carried out in a stainless steel glove box under dry nitrogen atmosphere in large (75 mL) test tubes. The tubes were charged in the order solvent, DMA, DTBP, cumyl chloride, monomers and co-initiators (Friedel Crafts reagents) at −80° C., unless otherwise stated. Here, it will be appreciated that cumyl chloride took the place of calixarene as a mono- rather than a poly-functional initiator. Polymerizations were initiated by the introduction of the co-initiators. Polymerization times were specified for each series of experiments. Polymerizations were quenched with pre-chilled methanol. Polymers were purified by dissolving in a minimum of MeCy and extracting with water. The products were dried in air at room temperature and in vacuo at 50° C. until weight constancy.

The first series of experiments determined whether the copolymer compositions were a function of comonomer feed. This series of experiments was carried out as follows: Into a series of 15 large (75 mL) test tubes were placed solvent (MeCl/MeCy 75/25%), various amounts of IB/St charges (see Table I), initiator (CumCl, $4 \times 10^{-4}$ M), electron donor (DMA, $4 \times 10^{-4}$ M), proton trap (DtBP, $1 \times 10^{-3}$ M), and cooled to −80° C. The reactors were agitated manually. Polymerizations were 1 min. The reactions were terminated by the addition of a few mL's of prechilled MeOH. The products were purified and dried. Details of the ingredients include: $TiCl_4$ stock solution(1.1 mL each experiment); 1 mL $TiCl_4$ dissolved in 46 mL solvent (75/25) MeCl/MeCy). $[TiCl_4]=4\times10^{-3}$ mol/L, $[CumCl]=4\times10^{-4}$ mol/L, $[DtBP]=1\times10^{-3}$ mol/L, and $[DMA]=4\times10^{-4}$ mol/L. $V_{tot}=55$ mL, AMI technique, T=−80° C. Table I sets forth the comparison between comonomer feed and copolymer composition as determined by proton NMR spectroscopy under these conditions. Copolymer compositions were determined by $^1H$ NMR, FTIR and GPC techniques. Attempts were made to keep copolymer conversions below 10%; however, the difficulty in controlling the copolymerizations at [CumCl]/[$TiCl_4$] ratios (1:10) made it only possible to keep conversions below 30%.

TABLE I

Experimental Series I-Comonomer Feed Versus Copolymer Composition.

| | IB/St (mole/mole) | |
|---|---|---|
| Experiment No. | $f_{IB}$ (Mole fraction IB in feed) | $F_{IB}$ (Mole fraction IB in copolymer) |
| 1 | 0.00 | 0.00 |
| 2 | 0.06 | 0.05 |
| 3 | 0.17 | 0.13 |
| 4 | 0.21 | 0.20 |
| 5 | 0.34 | 0.44 |
| 6 | 0.43 | 0.58 |
| 7 | 0.54 | 0.66 |
| 8 | 0.63 | 0.75 |
| 9 | 0.72 | 0.88 |
| 10 | 0.82 | 0.89 |
| 11 | 0.87 | 0.92 |
| 12 | 0.92 | 0.93 |
| 13 | 0.96 | 0.96 |
| 14 | 1.00 | 1.00 |
| 15 (control) | 1.00 | 1.00 |

The second series of experiments were directed toward determining whether the copolymer composition was a function of conversion. In this experiment, DMA, DtBP, and $TiCl_4$ concentrations, as well as the solvent ratio, were the same as in first series of experiments. The co-monomer feed was 21/79 mol/mol IB/St, the determined molar ratio for azeotropic polymerization of IB/St. Polymerizations were initiated by the addition of 1 mL co-initiators stock solution (1 mL $TiCl_4$ in 44 mL MeCl) to the charges, containing the monomer, DMA and DTBP. Total volume was 56 mL. Conversions and molecular weights were controlled by gradually increasing the time of polymerizations from 0.5 to 4.0 mins by ½ minute increments.

The third series of experiments determine whether number average molecular weight was a function of conversion for IB homopolymerization followed by IB/St copolymerization. The experimental conditions are as follows: DMA stock solution=DMA 152 µL in 224 mL MeCl; DtBP stock solution=220 µL DtBp in 36 mL MeCy; $BCl_3$ stock solution=2 mL $BCl_3$ in 42.2 mL MeCl; $TiCl_4$ stock solution=5 mL TiCl$_4$ in 27 mL MeCl; T=−80° C. Experimental conditions are further set forth in Table II. The first IB homopolymerization phase (Experiments 1–3) consisted of 3 incremental monomer additions. Thus, BCl$_3$ was added to a charge of 0.5 mL IB in 28 mL MeCl containing 19 μL DMA. The time between incremental IB additions was 60 minutes. Chilled MeOH was added to terminate the polymerizations. The products were isolated, and their M$_n$ and M$_w$/M$_n$ were determined by GPC (RI) by the use of PIB standards.

After three incremental IB additions, the incremental addition of IB/St mixtures was started. Thus, to living PIB charges were added 21/79 mol/mol (0.2/0.8 mL/mL) IB/St mixtures, 9 mL of DtBP stock solution, and 2 mL of TiCl$_4$ stock solution. Copolymerization time was 4 minutes.

A control experiment (no initiator) was also carried out with 1.1/4.0 mL/mL IB/St in 11.2/33.8 mL MeCy/MeCl, 2 mL TiCl$_4$ stock solution. The purpose of the control experiment was to ascertain that the level of proton trap was adequate to prevent protic initiation.

The order of reagent addition was as follows: Experiments 1–9: DMA stock solution (28.0 mL); IB (0.5 mL); CumCl (31 μL); BCl$_3$ stock solution (1 mL). Experiments 4–9: As in the previous series, followed by the addition of DTBP stock solution (9 mL), IB/St (0.2/0.8 mL/mL), and TiCl$_4$ stock solution (2 mL). Table II provides further details.

TABLE II

Experimental Series II-Mn Versus Conversion for IB Homopolymerization Followed by IB/St Copolymerization

| Experiment | Isobutylene (mL) | DMA Stock Solution (mL) | IB/St (mL/mL) | TiCl$_4$ Stock Solution (mL) |
|---|---|---|---|---|
| 1 | 0.5 | | | |
| 2 | 0.5 + 0.5 | | | |
| 3 | 0.5 + 0.5 + 0.5 | | | |
| 4 | 0.5 + 0.5 + 0.5 | 9 | 0.2/0.8 | 2 |
| 5 | 0.5 + 0.5 + 0.5 | 9 | 0.2/0.8 + 0.2/0.8 | 2 |
| 6 | 0.5 + 0.5 + 0.5 | 9 | 0.2/0.8 + 0.2/0.8 + 0.2/0.8 | 2 |
| 7 | 0.5 + 0.5 + 0.5 | 9 | 0.2/0.8 + 0.2/0.8 + 0.2/0.8 + 0.2/0.8 | 2 |
| 8 | 0.5 + 0.5 + 0.5 | 9 | 0.2/0.8 + 0.2/0.8 + 0.2/0.8 + 0.2/0.8 + 0.2/0.8 | 2 |
| 9 | 0.5 + 0.5 + 0.5 | 9 | 0.2/0.8 + 0.2/0.8 + 0.2/0.8 + 0.2/0.8 + 0.2/0.8 + 0.2/0.8 | 2 |

The fourth series of experiments was identical to the third series of experiments except the IB homopolymerization was omitted. Eight incremental co-monomer additions were used.

Upon synthesizing the azeotropic IB/St copolymer (i.e., poly(isobutylene-aze-styrene), characterization of the copolymer was determined via GPC (RI/UV) Method (Fodor et al.'s Algorithm), via FTIR Spectroscopy and via proton NMR Spectroscopy.

In determining copolymerization for the copolymer compositions ($F_{IB}$) by the GPC (RI/UV) method, Fodor et al.'s Algorithm was used. The technique is based upon the proportionality of the detector response for RI and UV detectors relative to the concentration of each monomer repeat unit. The instrument was calibrated with PIB and PSt homopolymer solutions of known concentrations and correlated with the area under the traces obtained by the RI and UV detectors. Because the IB repeat unit is UV inactive, the UV response is due only to the St monomer unit. The respective areas under the RI and UV traces at various concentrations were used to find constants for St and IB repeat unit responses, which were used to calculate the repeat unit content in the copolymer. The mole fraction of IB is given by $$m_{IB}/(m_{St}+m_{IB})=(A_{UV}b_{St}/a_{St}-A_{RI})/[(b_{St}/a_{St}-b_{IB}/a_{St})A_{UV}-A_{RI}]$$

where $m_{IB}$ and $m_{St}$ are the moles of the monomer that passes through the detector at time t; $A_{UV}$ and $A_{RI}$ are the areas under the respective detector traces; and a and b are calibration constants. With the aromatic initiator (Cumyl chloride) used, the UV trace overestimates the area corresponding to the St repeat unit; however, the error is insignificant because of the high molecular weights of the copolymers analyzed.

In using FTIR spectroscopy to determine the copolymer composition, it is understood that the relationship between optical density ratio (absorbance) and concentration of monomer repeat units in the homopolymer has been defined. Copolymer compositions were calculated by comparing the CH stretch of the St unit at 3061 cm$^{-1}$ relative to the CH$_2$ asymmetric stretch of both IB and St units at 2924 cm$^{-1}$. Absorbances were corrected for baseline absorbance. A FTIR spectrum of a representative IB/St copolymer is shown in FIG. 1.

Peak assignments are as follows: 3061 cm$^{-1}$ aromatic CH stretch, 2924 cm$^{-1}$ asymmetric CH$_2$ stretch, 2849 cm$^{-1}$ symmetric CH$_2$ stretch, 1950–1746 cm$^{-1}$ overtone/combination bands, 1602, 1492, 1452 cm$^{-1}$ C=C ring stretch, 1069 cm$^{-1}$ CH$_2$ twist and wag, 760–787 cm$^{-1}$ CH$_2$ rock, and 699 cm$^{-1}$ out of plane H–C=C bend.

Figure 2:
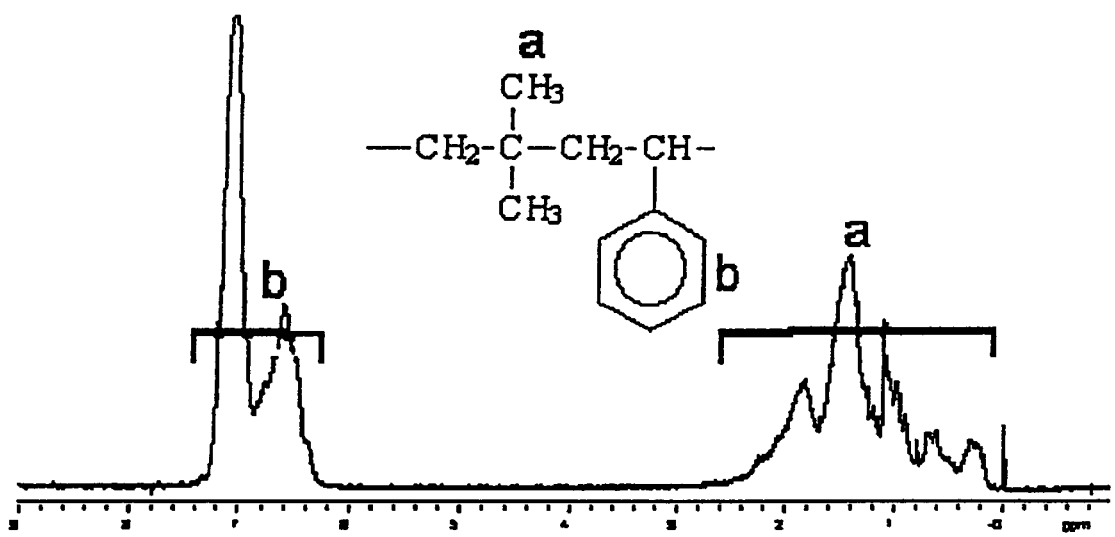
FIG. 2 is a $^1$H NMR spectrum of a representative statistical poly(isobutylene-aze-styrene) copolymer.

For determining the copolymer composition by $^1$H NMR spectroscopy, attention is directed to FIG. 2 which shows the $^1$H NMR spectrum of a representative copolymer. The copolymer composition was determined by comparing the integrations of aromatic and aliphatic resonances of $^1$H NMR scans:

$$\int aromatic/\int aliphatic=5x/[8(1-x)+3x]$$

where ∫aromatic and ∫aliphatic are the integrated areas of the aromatic and aliphatic regions, and x is the styrene mole fraction ($F_{St}$).

4. Results

Based upon the synthesis and characterization studies performed, the effect of a wide range of IB/St feed ratios on copolymerization has now been analyzed and conditions for living azeotropic IB/St copolymerization have been developed. The copolymerizations were induced by the well known CumCl/TiCl$_4$DMA/DtBP/-80° C. system that was previously used to mediate living IB and St. homopolymerizations.

Figure 3:
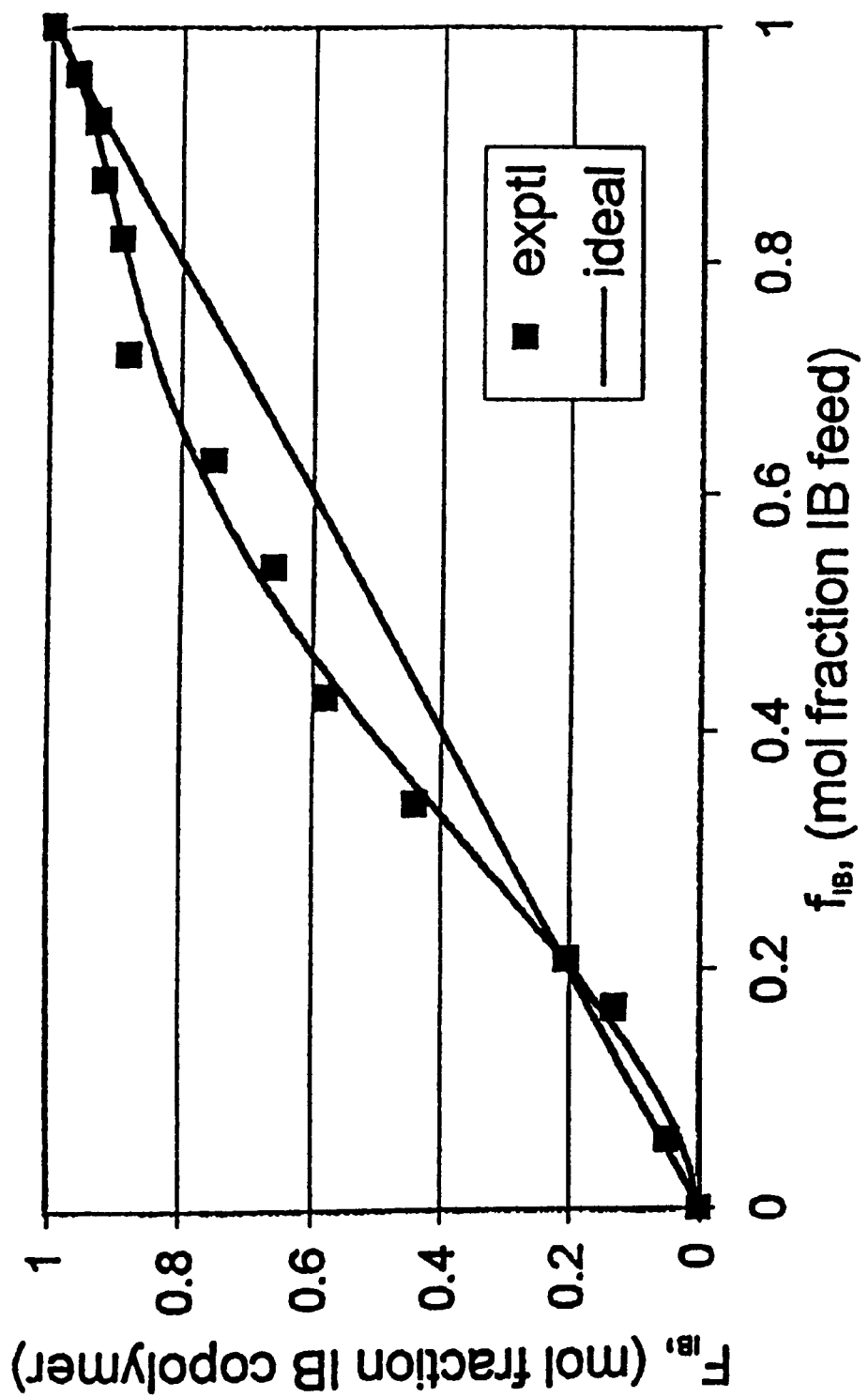
FIG. 3 is a representative graph of the data comparing the mole fraction of isobutylene (IB) in the feed ($f_{IB}$) versus mole fraction isobutylene (IB) in the copolymer ($F_{IB}$)

FIG. 3 shows the results of this series of experiments described by the first series of experiments. The copolymer composition versus comonomer feed plot crosses the ideal copolymerization composition ($r_{IB}=r_{St}=1$) at 21 mol % IB ($f_{IB}=21$ mol %) fully confirming Okumura et al.'s value.

The data in Table I was also used to determine the reactivity ratios $r_{IB}$ and $r_{St}$. Numerous efforts have been made to determine $r_{IB}$ and $r_{St}$ values by a large number of earlier investigations, however; most of the data are unreliable and have been criticized. Thus, according to Mortimer and Tidwell's Fortran program, $r_{IB}=3.41\pm0.23$ and $r_{St}=1.40\pm0.26$ indicating that both monomers prefer homopropagation to crosspropagation. (These values are virtually identical to those obtained by Harwood's Excel Program: $r_{IB}=3.03\pm0.30$ and $r_{St}=1.39\pm0.25$, respectively).

Figure 4:
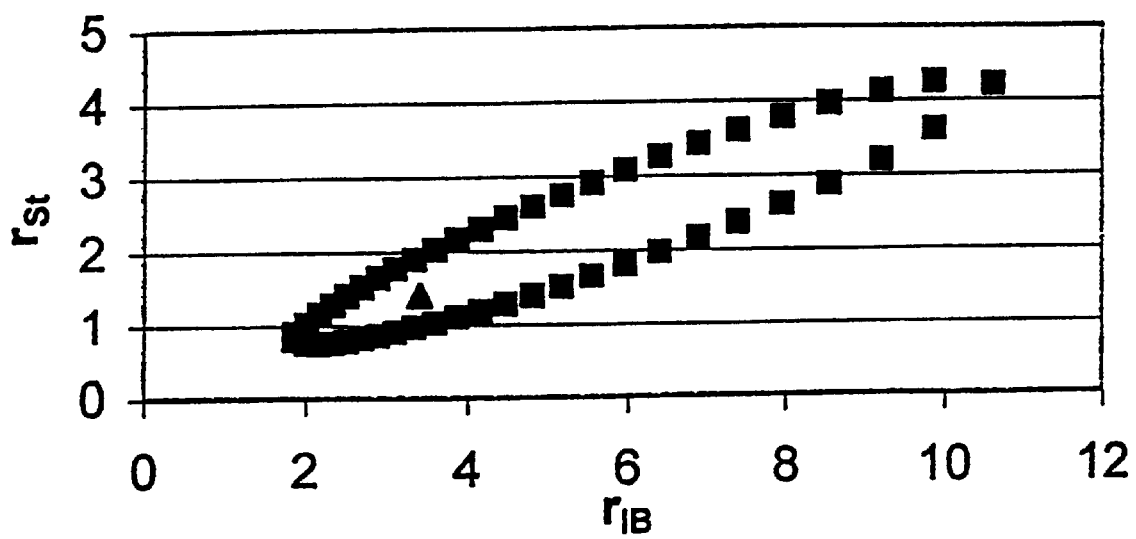
FIG. 4 is a representative graph comparing $r_{IB}$ and $r_{St}$ together withjoint confidence limits by the Mortimer Tidwell method.

FIG. 4 shows $r_{IB}$ and $r_{St}$ together with the joint confidence limits, determined by the Mortimer and Tidwell method. These values are in good agreement with those reported by Okamura et al., $r_{IB}$=4.11 and $r_{St}$=1.70, who used the intersection method.

Having determined reliable reactivity ratios, Harwood's sequence distribution and run number, R, for poly (isobutylene-aze-styrene) [P(IB-aze-St)] were calculated. By the use of Harwood's method, R was found to equal 24, notably a value somewhat smaller than R=32 calculated for a random copolymer of 21/79 mol/mol IB/St.

Figure 5:
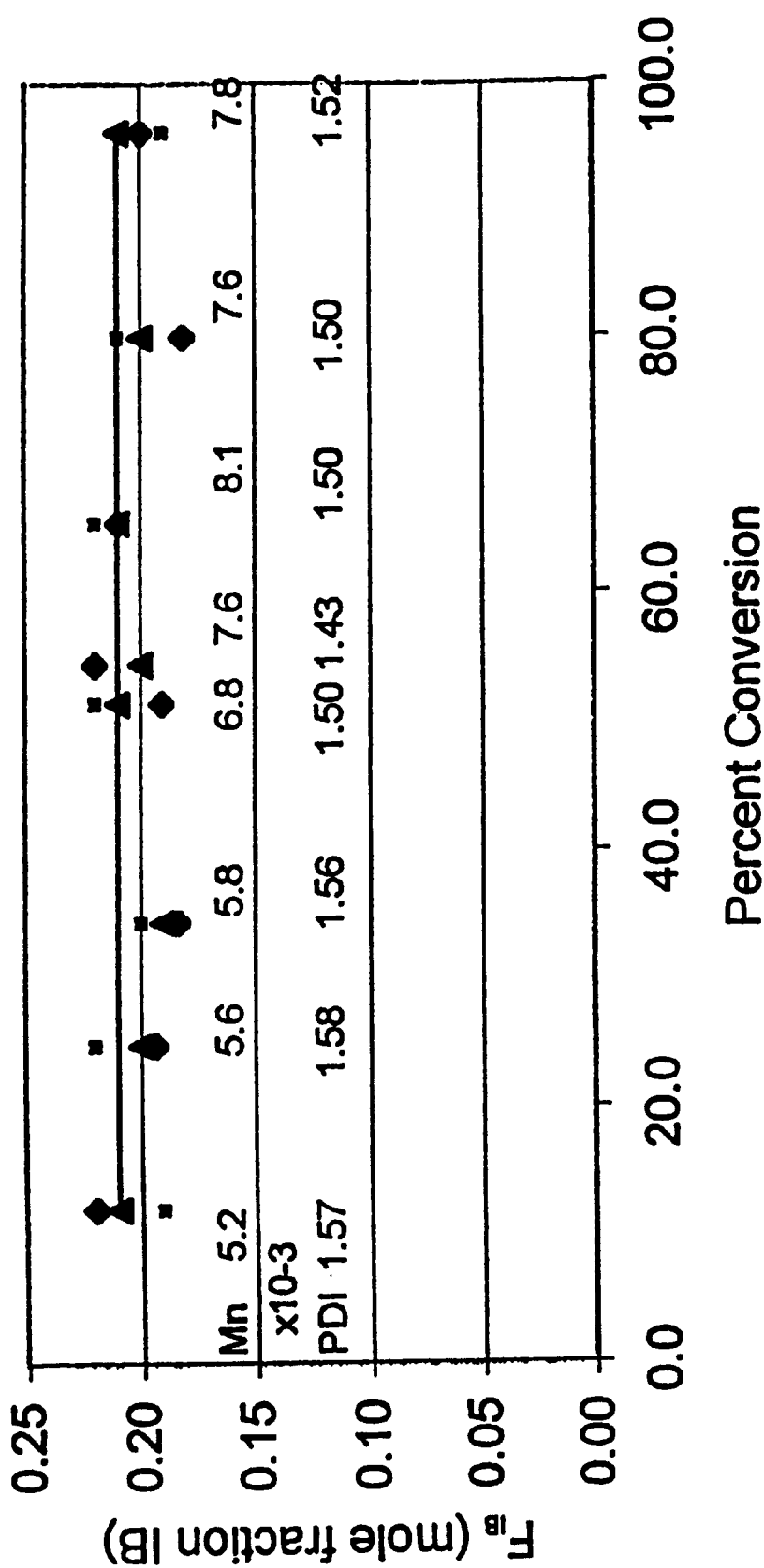
FIG. 5 is a representative graph showing the results of a series of experiments comparing the effect of conversion on the isobutylene/styrene (IB/St) azeotropic copolymer composition.

As noted above, the second series of experiments was conducted to determine the effect of conversion on the composition of IB/St copolymers prepared with $f_{IB}$=0.21 mol fraction. FIG. 5 summarizes the results. The horizontal line in FIG. 5 indicates the azeotropic composition. Mn and PDI values were determined by GPC (RI) using polyisobutylene standards. According to NMR, FTIR and GPC analysis, copolymer compositions remain constant at 21/79 mol/mol IB/St over the 12–96% conversion range.

Figure 6:
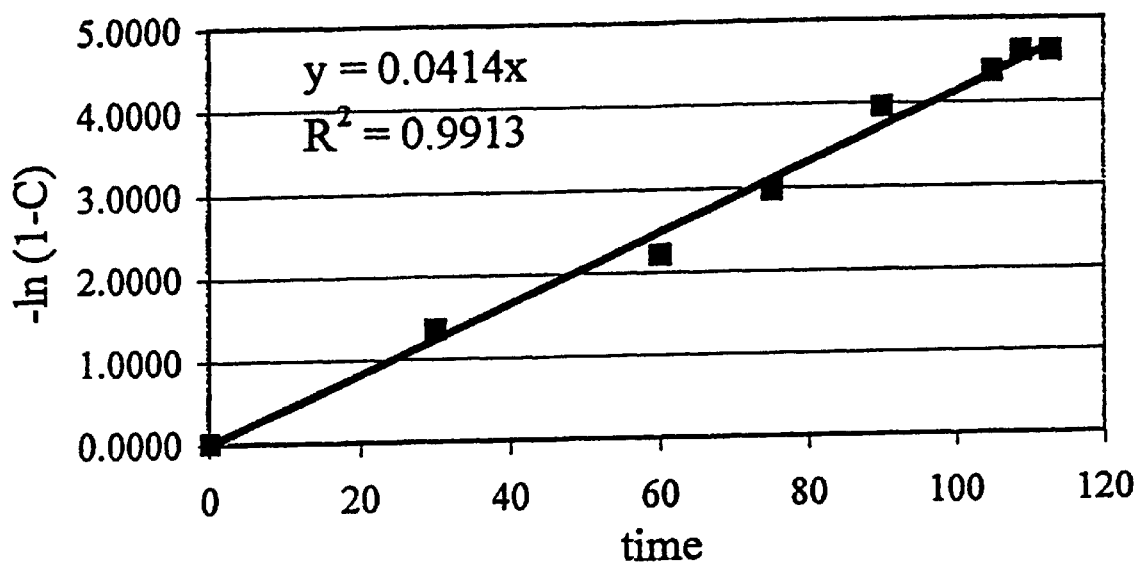
FIG. 6 is a representative first order plot graph of IB/St copolymerization indicating absence of termination in the experiments performed.

From the information determined hereinabove, conditions for the living azeotropic copolymerization of IB/St by the use of 21/79 mol/mol IB/St mixtures were developed. As previously noted, Orszagh et al have analyzed the kinetics of cationic IB/pMeSt copolymerization and have shown that linear $-\ln(1-C)$ versus time plots, (from $-\ln(1-C)=k[I]_o t$, where C is the overall conversion, k is the apparent rate constant, $[I]_o$ is the initial initiator concentration, and t is time), are sensitive indicators for the absence of termination in copolymerizations. This treatment was employed to analyze azeotropic IB/St copolymerizations. FIG. 6 shows the results. The linearity of this first order plots indicates the absence of termination.

Subsequent experimentation focused on finding conditions under which chain transfer to monomer was absent or negligible. Thus, numerous series of experiments were carried out to define the suitable reagents (coinitiators, electron donor, proton trap, solvent composition), reagent concentrations and other conditions for living IB/St copolymerization. As a result of these investigations experimental conditions were defined for living azeotropic IB/St copolymerizations, or, stating it more precisely, for conditions under which chain transfer to monomer is negligible during the time frame of azeotropic IB/St copolymerizations. Thus, the optimum conditions for living azeotropic copolymerization of IB/St mixtures, at least up to $M_n$ 24,000 g/mol where the $T_g$ of the copolymer levels off (i.e. becomes unaffected by $M_n$) have been determined. These conditions include: IB/St 21/79 mol/mol; Cumyl chloride $7\times10^{-3}$ mol/L; TiCl$_4$/BCl$_3$ 0.112/0.226 mol/L/mol/L; DMA $7\times10^{-3}$ mol/L; DtBP $1-8\times10^{-3}$ mol/L; MeCl/MeCy 75/25 vol %/vol %; and temperature $-80°$ C. If more than $7\times10^{-3}$ DMA was used, the copolymerization rates were too low as seen by higher than theoretical $M_n$s and $I_{\mathit{eff}}$'s and broad polydispersities. Undesirable protic initiation occurred at [DTBP]<1× $10^{-3}$ as indicated by lower than theoretical $M_n$ and broad polydispersities. Changing the polarity of the solvent mixture of 75/25 vol/vol MeCl/MeCy by ±5% did not affect livingness, however, it negatively affected the azeotropic copolymerization, i.e., the copolymer compositions drifted with conversion and copolymer compositions were not equal to the comonomer feed.

In order to prove the livingness of azeotropic IB/St copolymerization, a two-phase experiment was carried out. In the first phase, living IB polymerization was effected under conditions known to yield living homopolymerization of IB monomer. Subsequently, in the second phase, after the living IB polymerization was well under way (i.e., after three incremental IB additions), IB/St mixtures were incrementally added to the living IB homopolymerization system to force the system to switch to living IB/St copolymerization. This experiment was expected to yield a diblock consisting of a PIB block covalently bound to an azeotropic IB/St copolymer block.

Figure 7:
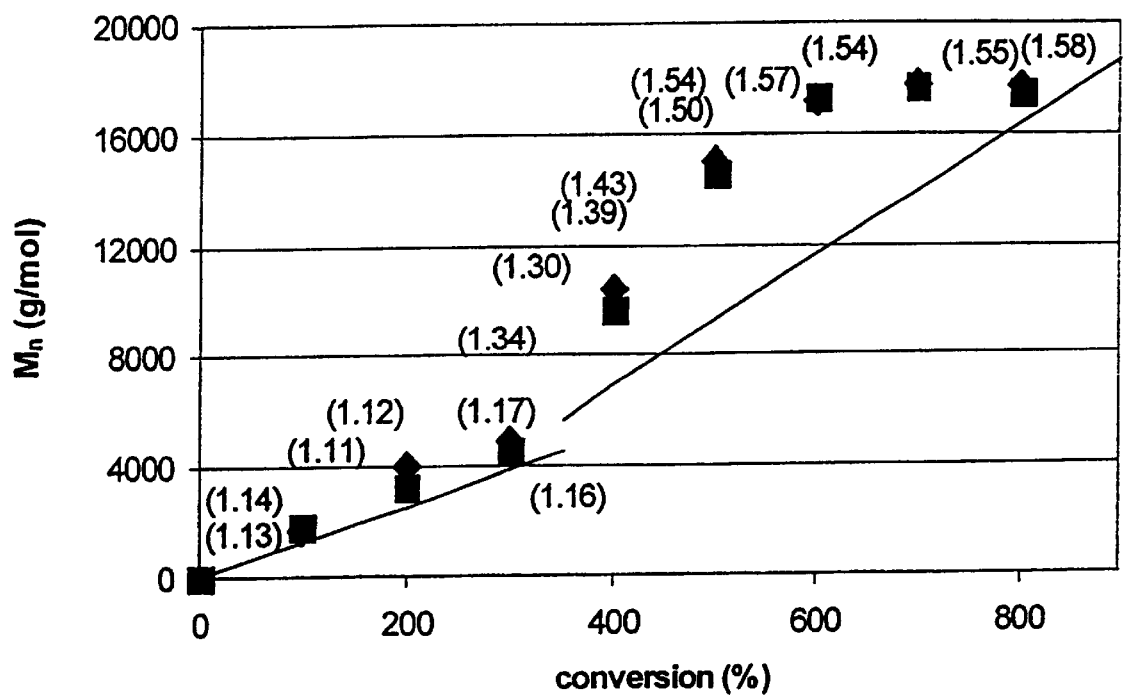
FIG. 7 is a representative graph showing Mn as a function of conversion of homopolymerization of IB and azeotropic copolymerization of IB/St for duplicate experiments.

FIG. 7 shows the determined Mn's of the products as a function of incremental monomer additions (conversion). Numbers in parentheses represent polydispersities determined by GPC(RI) with PIB standards. The diagonal lines are theoretical. During the first phase of the experiment, the $M_n$ values are reasonably close to theoretical values and the molecular weight distributions are quite narrow ($M_w/M_n=$ 1.11–1.17) indicating living IB polymerization. After three incremental IB additions, the incremental addition of IB/St charges was started. During the initial IB/St copolymerization phase the $M_n$s are higher than theoretical and the PCI's broaden, however, with increasing incremental monomer additions the $M_n$s approach theoretical values.

This deviation of the initial Mns from the theoretical values is characteristic of a living polymerization with slow initiation. The break in the slopes of the theoretical lines is an artifact believed due to experimental exigencies balancing reagent concentrations, molecular weight, and product solubility to avoid precipitation in small-scale IMA experiments. This clue for slow initiation was followed up by systematic experimentation using known techniques for the diagnosis of low rate of initiation $R_i$ in living polymerization.

Figure 8:
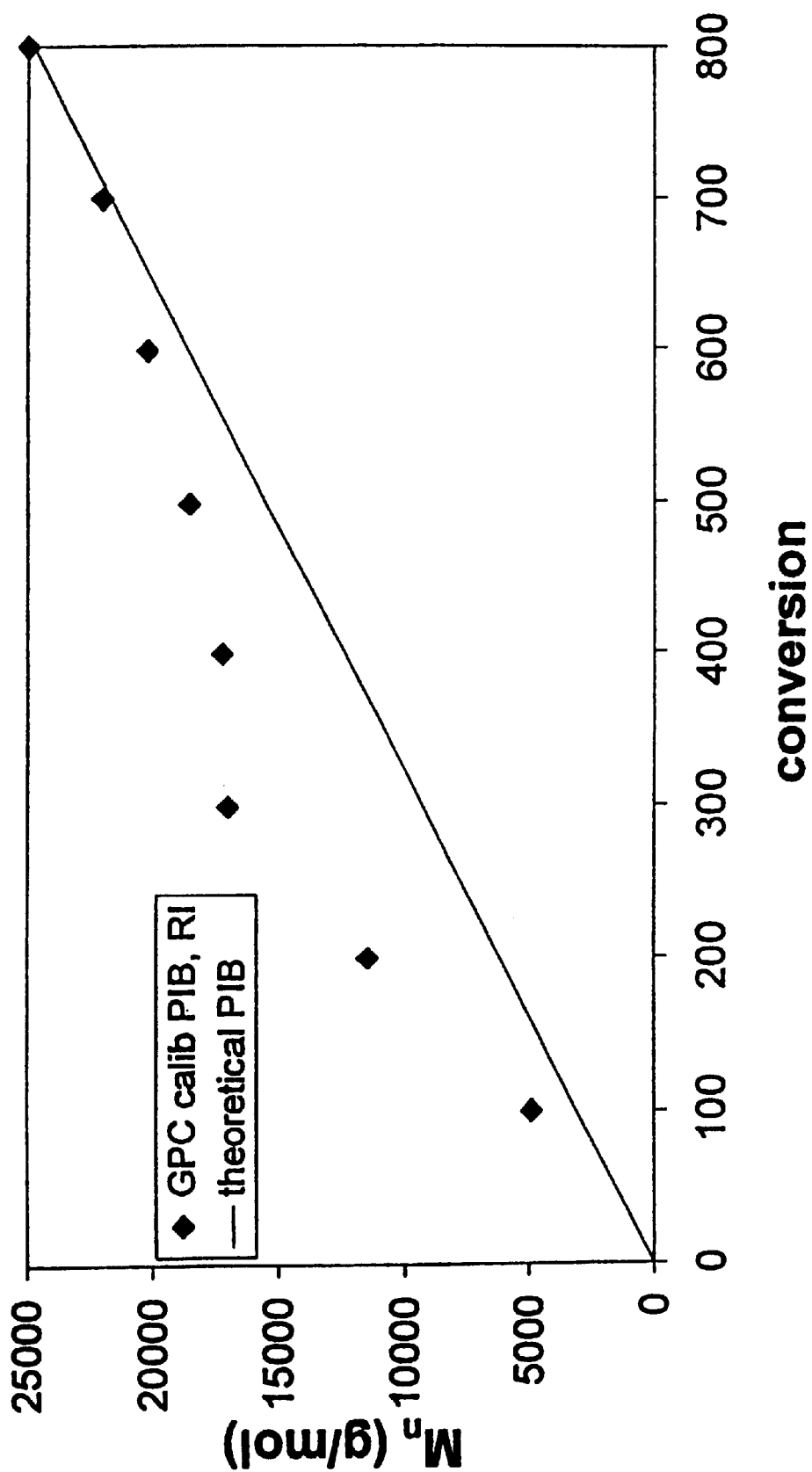
FIG. 8 is a representative graph of Mn versus conversion of IB/St copolymerization using GPC(RI) callibrated by polyisobutylene standards.

Using mathematical equations and known functions and plotting the data, it has been determined that slow initiation of a living copolymer is produced. To confirm relatively slow initiation gleaned from the data, and to ascertain that copolymer $M_n$s indeed reach theoretical values with increasing conversions, an azeotropic copolymerization experiment was carried out with up to eight incremental IB/St additions. The results of this experiment are summarized in FIG. 8. The $M_n$ versus conversion plot shows the characteristic signature of slow initiation. The experimental Mns reach theoretical values (shown as the line) after the seventh IB/St increment. This finding, together with other evidence not shown here, is convincing evidence for living azeotropic IB/St copolymerization proceeding with relatively slow initiation. ps 5. Characterization Copolymer compositions were determined by the use of three independent techniques: integrations of $^1$H NMR spectra, GPC, and FTIR spectroscopy. The results are summarized in Table III. The compositions obtained by the three techniques are in good agreement and reconfirm the azeotropic composition at $f_{IB}$=0.21 (See FIG. 4).

TABLE III

Azeotropic Poly(Isobutylene/Styrene) Copolymer Composition ($F_{IB}$)

| Experiment | Proton NMR | FTIR | GPC |
|---|---|---|---|
| 1 | 0.22 | 0.19 | 0.21 |
| 2 | 0.19 | 0.22 | 0.20 |
| 3 | 0.18 | 0.20 | 0.19 |
| 4 | 0.19 | 0.22 | 0.21 |
| 5 | 0.22 | 0.20 | 0.20 |
| 6 | 0.21 | 0.22 | 0.21 |
| 7 | 0.18 | 0.21 | 0.20 |
| 8 | 0.20 | 0.19 | 0.21 |

Figure 9:
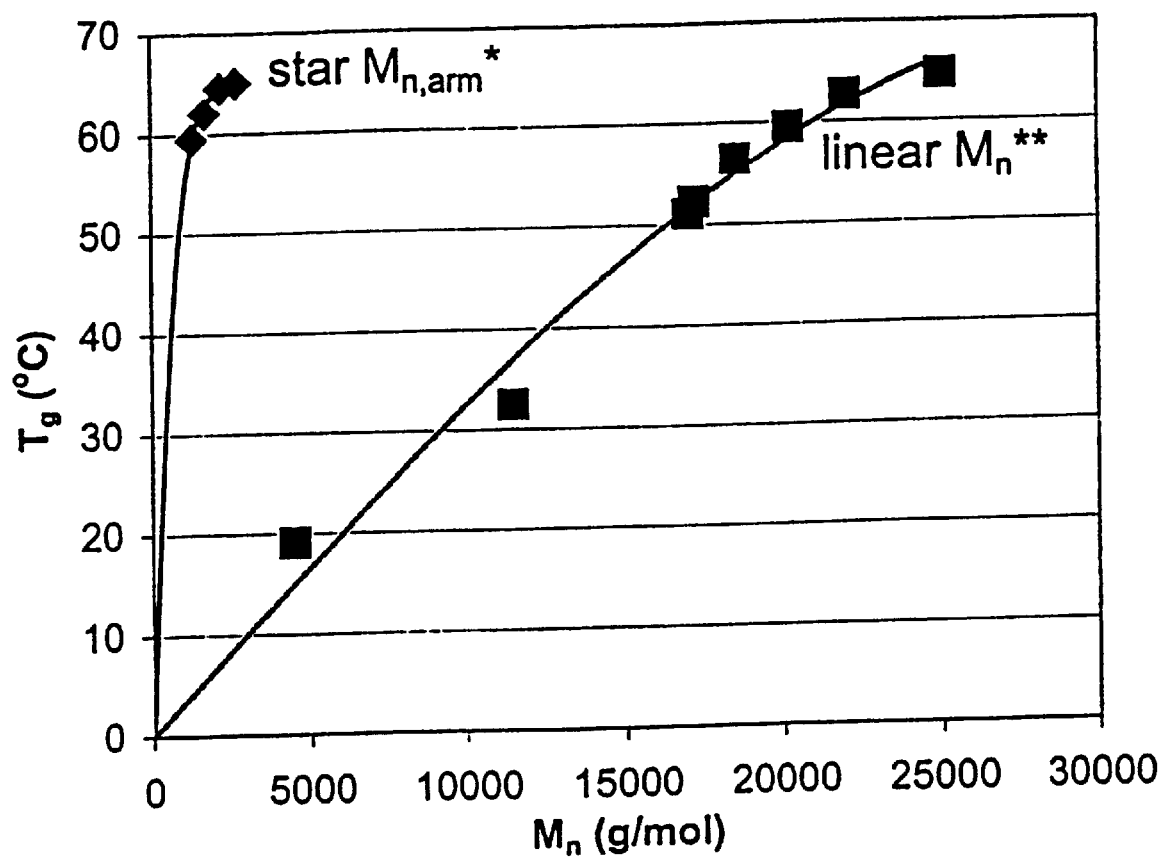
FIG. 9 is a representative graph showing Tg versus Mn of linear azeotropic IB/St copoolymer and its star counterpart.

The molecular weight of azeotropic IB/St copolymers at which their glass transition Tg reaches a plateau has been determined. FIG. 9 shows the data. The Tg appears to reach a plateau at about 64° C. at $M_n$ of about 24,000 g/mol. The Tg's of reasonably high molecular weight PIB and PSt are −73° C. and 100° C., respectively. The Tg of copolymers can be calculated by:

$$1/T_{gp} = w_a/T_{ga} + w_b/T_{gb}$$

where $T_{gp}$ is the predicted glass transition of the copolymer. $T_{ga}$ and $T_{gb}$ are the glass transitions of homopolymer a and b, and $w_a$ and $w_b$ are the weight fractions of the respective homopolymers. The calculated $T_g$ of P(IB-aze-St) is 64.1° C. for the 21/79 mol/mol IB/St composition, which is in excellent agreement with the experimental value of about 64° C.

The thermal stability of azeotropic IB/St copolymers was investigated by TGA in air. According to this technique, the initial thermal decomposition temperature (5% weight loss) of azeotropic IB/St copolymers of $M_n$ at about 24,000 g/mol is 250° C. The origin of the samples used in these experiments was the same as those used for $T_g$ studies.

Thus, preparatory to the synthesis of stars with P(IB-aze-St) arms, azeotropic copolymerization of IB/St mixtures were made and characterized. Reliable copolymerization reactivity ratios have been determined: $r_{IB}$=3.41±0.23 and $r_{St}$=1.40±0.26. The living carbocationic azeotropic copolymerization of the IB/St monomer pair has been achieved within the limits of the experiment by the use of the CumCl/(BCl$_3$—TiCl$_4$)/(MeCl/MeCy)/DMA/DtBP—80° C. system. Livingness was demonstrated by rate and incremental monomer addition experiments. The azeotropic composition is 21/79 mol/mol IB/St and compositionally homogeneous copolymers can be obtained practically over the entire conversion range at the azeotropic point. The azeotropic IB/St copolymer displayed a $T_g$ of 65° C. at $M_n$ of about 24,000 g/mol, which is in line which calculated values.

Returning to the description of the invention and Scheme I hereinabove, it will be appreciated that upon initiation of copolymerization using the multi-functional initiator, i.e., calix[n]arene, in conjunction with at least one Freidel-Crafts acid, as well as the comonomers, a statistical star copolymer is formed, this intermediate telechelic star polymer having chlorine termini on the arms. That is, where the terminating agent employed to quench the polymerization reaction is methanol, it will be appreciated that the end of each arm of the resultant composition will have a tert-Cl group. It will be appreciated that, in such a case, the composition can be further functionalized based upon various known techniques such as dehydrochlorination or substitution of the tert-Cl group. In one preferred embodiment, substitution by allylation using allyltrimethylsilane to end quench the living poly(isobutylene-co-styrene) copolymer is provided (See Scheme I), thereby forming the copolymer having —CH$_2$CH=CH$_2$ functionalized end groups. Conversion of the —CH$_2$CH=CH$_2$ termini to primary alcohol end groups, —CH$_2$CH$_2$CH$_2$OH, can then be obtained quantitatively by hydroboration/oxidation as is known in the art. Thus, star polymers having a calix[n]arene core and multiple arms of statistical poly(isobutylene-co-styrene) copolymers radiating from the core and fitted with crosslinkable endgroups can be obrtained. In particular, the desired star polymers have allyl or hydroxyl functional ends. Such stars are of particular interest for coating and sealant applications, particularly where the statistical IB/St copolymer arms have a $T_g$ that can be "tuned" between −73° C. and +100° C., i.e., between the $T_g$'s of PIB and PSt, respectively. Furthermore, it has been found that the hydroxyl-terminated stars can be crosslinked using diisocynates as the crosslinking agent. Diisocyanates are commonly used in coating applications.

In order to demonstrate practice of the invention, the following experiments concerning the synthesis, characterization and crosslinking of novel eight arms stars comprising a well-defined calix[8]arene core out of which emanate azeotropic IB/St copolymer arms, whose $T_g$ can be controlled from −73° C. to +100° C. and whose termini are fitted with crosslinkable endgroups, e.g. allyl, hydroxyl, have been performed.

EXAMPLE 2

Example 1 concerned the azeotropic copolymerization of an IB/St pair, regarded as a model of statistical P(IB-co-St)'s in general. Therein, suitable conditions for the living azeotropic copolymerization of this monomer pair were developed and livingness (i.e., the essential absence of chain transfer and termination up to $M_n$ at about 24,000 g/mol) was demonstrated. The azeotropic composition was 21/79 mol/mol IB/St. As previously noted, the advantage of azeotropic copolymerizations is that, at the azeotropic composition point, the feed and copolymer compositions are identical so that compositionally homogeneous products can be obtained over a wide conversion range even in small-scale laboratory experiments.

In Example 2, it is demonstrated that the model azeotropic IB/St copolymerization can be adapted for the precision synthesis of the target octa-arm stars. Further, the length (molecular weight) of the copolymer arms can be controlled and can be quantitatively functionalized with various endgroups. Experiments herein also provide insight into the thermal and solution properties of well-defined stars.

In Example 2, the synthesis, characterization and crosslinking of a new family of octa-arm star polymers of possible significance for coating applications is established. The target stars consist of a well-defined calyx[8]arene core out of which radiate exactly eight P(IB-co-St) arms fitted with allyl or hydroxyl termini (see Scheme II). The molecular weight and the compositions of the P(IB-co-St) arms can be controlled and thus their $T_g$'s can be "tuned" from −73° C. (the $T_g$ of PIB) to 100° C. (the $T_g$ of PSt).

Scheme II

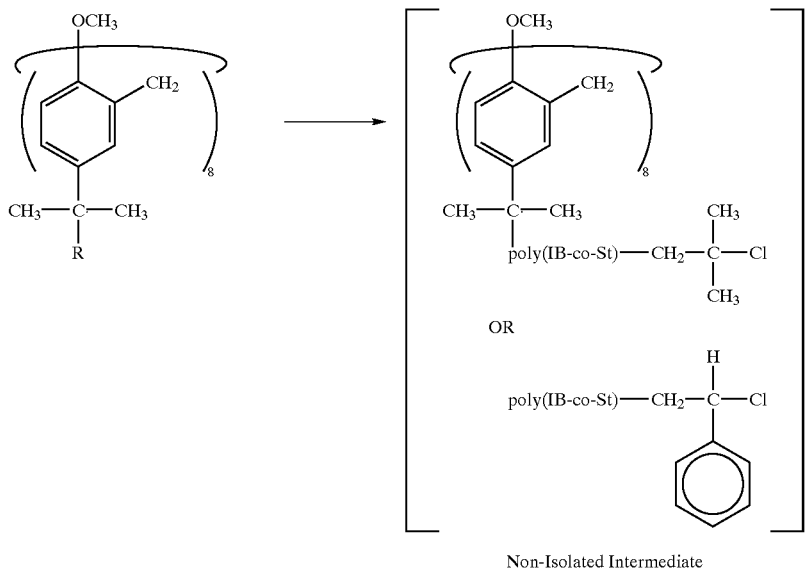

Non-Isolated Intermediate

Allylation:

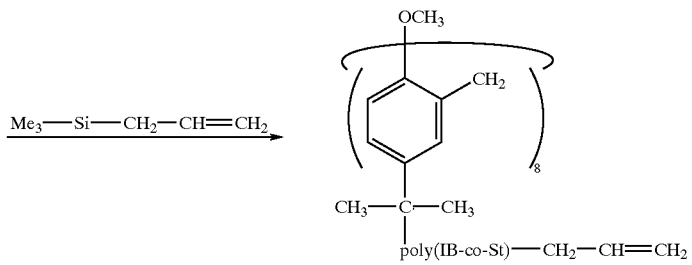

Hydroboration/Oxidation:

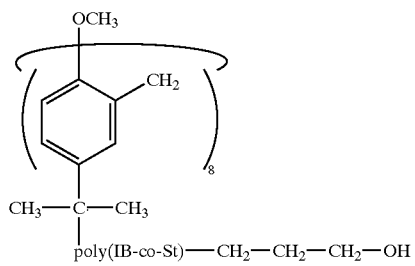

1. Materials

The purification and source of the chemicals have been described in Example 1. Allyltrimethylsilylchloride (ATMS), trimethylsilyl chloride (TMSCI), sodium hydroxide, benzene, magnesium sulfate, $CDCl_3$, tetrahydrofuran, sulfuric acid, potassium carbonate, 9-borabicyclo[3.3.1]nonane (9-BBN) in THF (0.5M), hydrogen peroxide (30% wt in water), 2,4-tolylene diisocyanate (TDI), 4,4=-methylene bis(phenyl) diisocyanate (MDI), chloroform, tetrahydrofuran, and propylene glycol methyl ether acetate (PGDMEA) (all from Aldrich) were used as received.

The synthesis of 5,11,17,23,29,35,41,47-(2-methoxypropyl)-49,50,51,52,53,54,55,56-octamethoxycalix[8]arene, as referred to as C[8]$OCH_3$, followed a well known procedure. The purification of the final product was effected by recrystallization from hexane/THF mixtures. The purity of the product was >98% as determined by use of $^1H$ and $^{13}C$ NMR spectrocsopy, MALDI MS, and triple detection GPC.

2. Equipment

Molecular weight determinations were made by GPC RI/UV as known in the art. Absolute molecular weights were obtained by triple detector GPC equipment [viscosity detector (Viscotek Corp.), Dawn EOS laser light scattering (Wyatt Technologies) and refractive index detectors (Waters Corp.)]. A differential scanning calorimeter (DSC), thermal gravimetric analyzer (TGA), nuclear magnetic resonance (NMR), and Fourier transform infra-red (FTIR) equipment and known techniques for use therewith were also used.

3. Procedure

Scheme II outlines the synthesis strategy of the present Example 2. The first and second arrow summarize the route to a star consisting of a calix[8]arene core out of which radiate eight IB/St copolymer arms fitted with —$CH_2$—CH=$CH_2$ endgroups. The intermediates carrying —$CH_2$C (CH$_3$)$_2$Cl or —CH$_2$CH(C$_6$H$_5$)Cl endgroups (shown in brackets) were not isolated. It was presumed that styrene endgroups would quantitatively react with allyltrimethylsilane, as well as the isobutylene endgroups, to give the target octa-allyl telechelic star. Studies have fully confirmed these predictions. The third arrow indicates the conversion of the allyl termini to primary hydroxyl termini by hydroboration/oxidation. The literature contains ample evidence that the latter functionalization is essentially quantitative.

Copolymerizations were carried out in large (75 mL) test tubes or in 1000 mL three neck round bottom flasks. The general technique, work-up, and purification of polymers have been described previously. Control experiments (no initiator) were run to ascertain that protic initiation was largely absent due to the use of adequate levels of proton trap. Control experiments were carried out with 1.1/3.95 mL/mL IB/St dissolved in 33.8/11.2 mL/mL MeCl/MeCy solvent mixture, and adding 2 mL TiCl$_4$ stock solution (5 mL TiC$_4$+27 mL MeCl).

In a first series of experiments, M$_n$ as a function of conversion using the octafunctional initiator C[8]OCH$_3$ was reviewed. To that end, MeCl, C[8]OCH$_3$ (0.5 mL of a stock solution prepared by dissolving 1.5 g of C[8]OCH$_3$ in 5 mL of MeCl), and IB/St (0.2/0/8 mL) were placed into a series of 8 large (75 mL) test tubes. Polymerizations were initiated by the addition of BCl$_3$ (1 mL stock solution of 5 mL BCl$_3$ in 37 mL MeCl). After 10 minutes, 37.1 mL of a pre-prepared solvent mixture containing DtBP (495 µL) and MeCl (252 mL), MeCy (81 mL), and DMA (171 µL) was added to the charge to bring the MeCl/MeCy volume ratio to about 75/25. TiCl$_4$ was introduced (2 mL of a stock solution prepared by dissolving 5 mL, TiCl$_4$ in 27 mL MeCl). The reactors were agitated manually. The polymerization time (after TiCl$_4$ addition) was about 4 minutes. Reactions were terminated by the addition of prechilled methanol. The products were purified and dried as known. Compositions and structures were determined by $^1$H NMR and FTIR spectroscopies, and GPC techniques.

Kinetic experiments were carried out in duplicate by using the incremental monomer addition (IMA) technique. The ratio of comonomers was IB/MeSt=21:79 mol/mol, and those of the solvents was MeCl/MeCy=75:25 vol %. C[8]OCH$_3$=7×10$^{-3}$ mol L$^{-1}$. The DMA concentration was 1:1 relative to the aromatic methoxyl concentration, and DtBP= 8×10$^{-3}$ mol L$^{-1}$. [BCl$_3$]/[C[8]OCH$_3$] ratio was 192:1, and [TiCl$_4$]:[C[8]OCH$_3$] ratio was 128:1. Polymerizations were effected at −80° C. Quenching and purification were conducted as well known in the art.

The next series of experiments were conducted to synthesize allyl-terminated stars. Experiments were conducted with mechanical stirring in 1000 mL three neck round bottom flasks. The weight of C[8]OCH$_3$ used was 0.5 g (8.75×10$^{-3}$ mol/L). The amount of monomers (IB/St) was varied to afford varying molecular weights. The total volume of the charge was 412 mL. Polymerizations were quenched by the addition of prechilled ATMS, followed by 40 minutes of stirring. The stars were characterized by $^1$H NMR and FTIR spectroscopies, and GPC.

Next, hydroboration/oxidation of the allyl terminated stars was performed. Hydroboration/oxidation followed established and known procedures. Chain end functionality was determined. The —OSi(CH$_3$)$_3$ derivative was characterized by $^1$H NMR spectroscopy as reported for linear analogs.

Finallly, the hydroxyl-terminated stars were crosslinked using diisocyanates as the crosslinking agent. Procedures followed established protocols. The calix[8]arene/azeotropic copolymer arm stars with hydroxyl end groups was dissolved in dry solvent (chloroform at 25° C., tetrahydrofuran at 25° C., or PGDMEA at 60° C.) to give a 30% wt solution and the diisocyanate (TDI or MDI) was added at a OH:NCO ratio of 1.1:1. In chloroform and tetrahydrofuran, upon addition of the diisocyanate, turbidity could be observed within seconds indicating the onset of gelation (crosslinking). In contrast, in PGDMEA, gelation occurred over a 24 hour period. To complete the crosslinking in chloroform and tetrahyrrofuran the systems were stored for an hour at room temperature, and the volatile solvents were removed by placing the gels in a drying oven at 50° C. until weight constancy was reached (~18 hours). The PGDMEA systems were stored for 24 hours at 60° C., then placed at 50° C. in a vacuum oven for 18 hours until weight constancy. Subsequently, the % sol was determined by weighing the films, soaking and shaking them for an hour in the same solvent the crosslinking was performed, decanting the solvent, drying the films until weight constancy, and reweighing them to obtain the sol fraction. These assays were performed by the use of aluminum weighing dishes and glass beakers. The hardness of the films was determined by a Shore A Durometer and standardizing with a calibrating block.

4. Results

Investigations started by demonstrating that the model living azeotropic copolymerization of IB/St charges developed in the first phase of our investigations (Example 1) can indeed be adapted for the synthesis of the target octa-arm stars (see Scheme II). Experiments by the use of C[8]OCH$_3$/BCl$_3$/TiCl$_4$ combinations indicated that the living azeotropic copolymerization of IB/St charges can be mediated by this initiating system and that the target octa-telechelic stars can be obtained.

Figure 10:
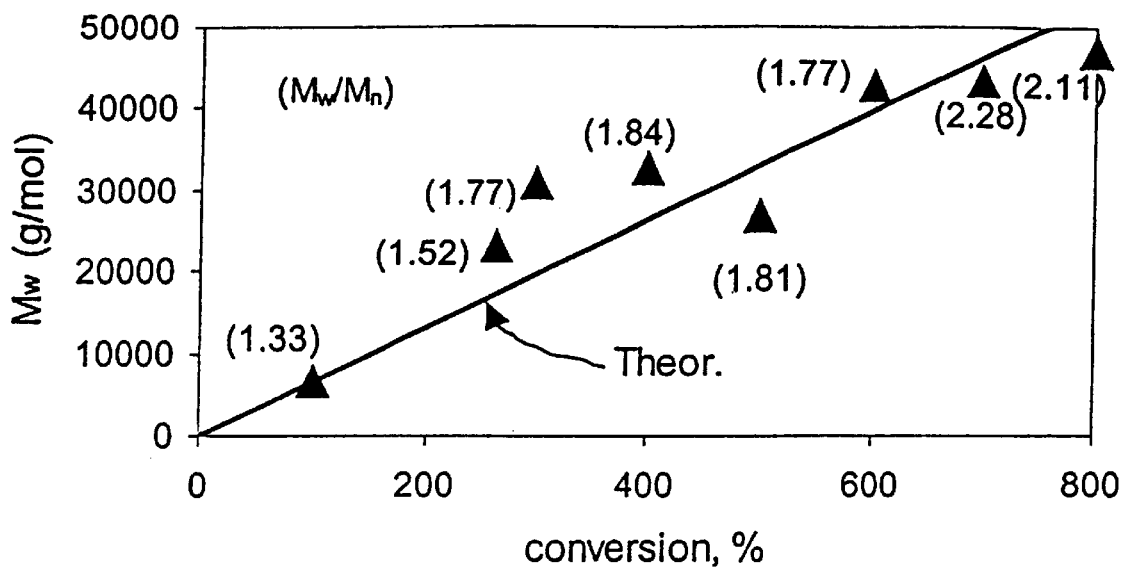
FIG. 10 is a representative graph of Mw in g/mol versus conversion (%) of IB/St copolymerization with increasing monomer additions.
Figure 11:
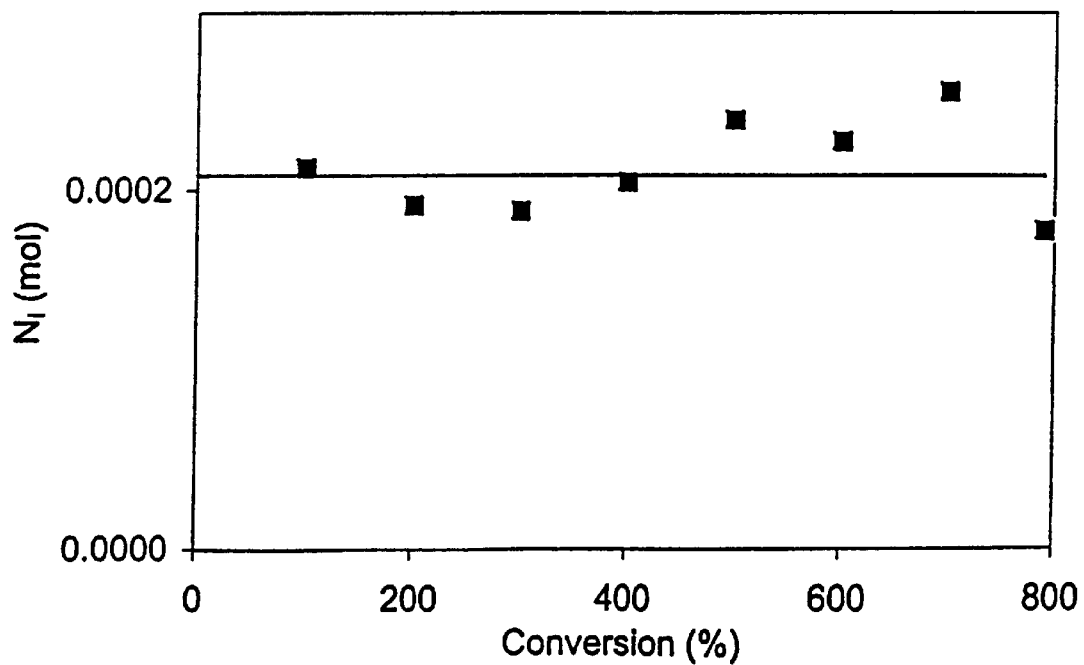
FIG. 11 is a representative graph of Ni, the number of polymer molecules (mol), (which equals the number of moles of initiator C[8]OCH$_3$) as a function of percent conversion of IB/St copolymerization with increasing monomer additions.

FIGS. 10 and 11 show the results of a representative series of experiments indicating living azeotropic copolymerizations were induced by the C[8]OCH$_3$ initiator, and the molecular weights were increased stepwise by eight incremental IB/St additions. According to the findings summarized in FIG. 10, the molecular weights of the star increase monotonically with the number of increasing monomer additions, suggesting living azeotropic copolymerization. The Mw/Mn increases with increasing conversion, which indicates that livingness is increasingly compromised with increasing molecular weight. In view of the complexity of these copolymerizations, however, the data are deemed acceptable. FIG. 11 indicates that the number of molecules formed with increasing conversion remains constant and that it is essentially equal to the concentration of C[8]OCH$_3$ employed.

Next, the functionalization of arm termini was explored. The IB/St copolymerization charges were expected to give rise to two kinds of termini: —CH$_2$C((CH$_3$)$_2$Cl due to isobutylene (IB) ends, and —CH$_2$C(Ph)Cl due to styrene (St) ends (see formula in brackets in Scheme II). As known in the art, IB end groups can be converted quantitatively to allyl groups by quenching with ATMS. We assumed that the styrene ends would also allylate quantitatively. Thus, instead of isolating the stars and characterizing their end groups, we proceeded to endquench the living systems with ATMS and thus to generate in one step the target end groups (see second arrow in Scheme II).

Figure 12:
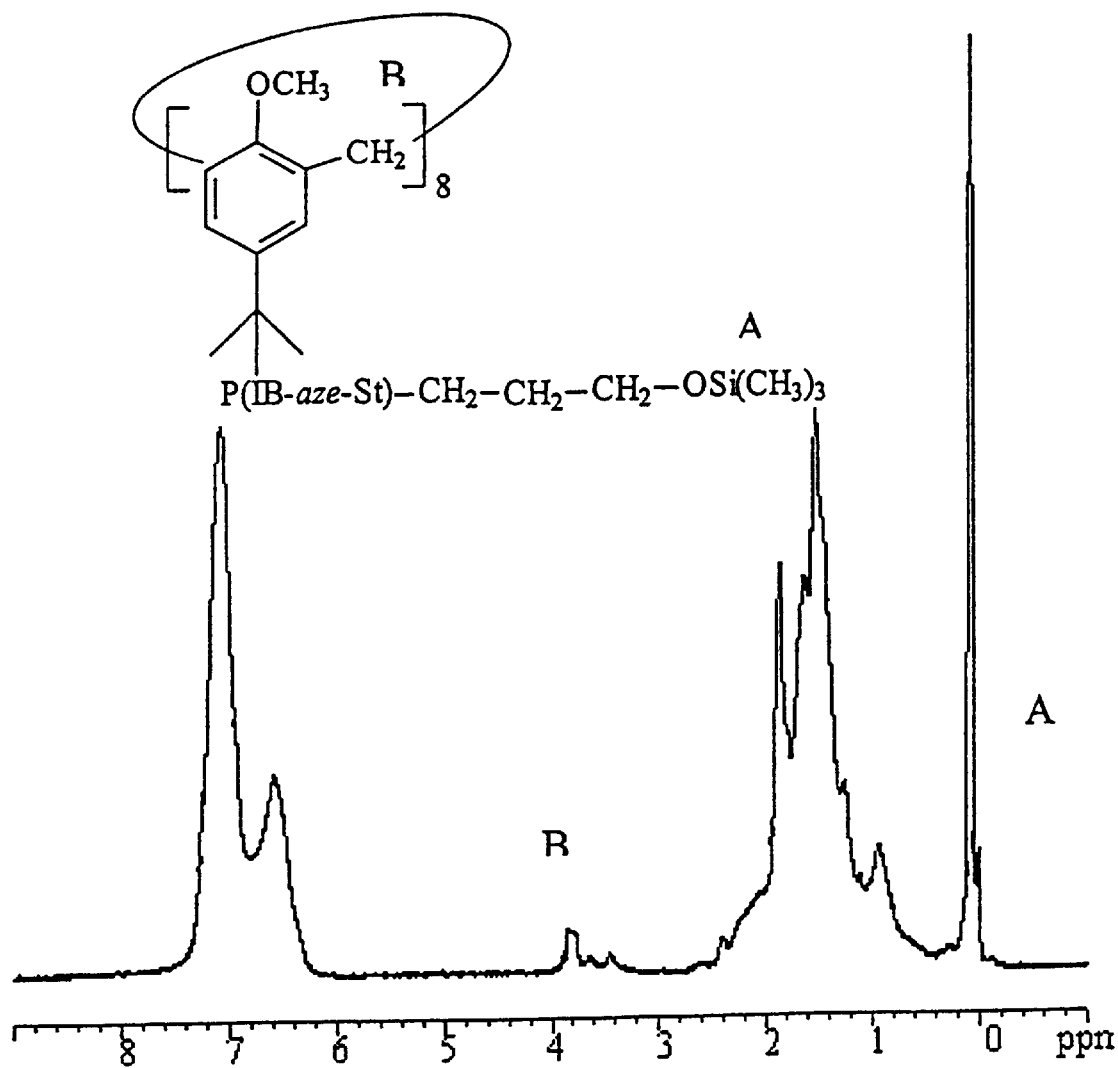
FIG. 12 is a $^1$H NMR spectrum of a representative allyl-terminated poly(isobutylene-aze-styrene) star copolymer.

FIG. 12 shows the $^1$H NMR spectrum of a star endquenched with ATMS together with assignments. The number of arms was quantitated by integrating the areas associated with the aromatic methoxdyl protons (δ3.79 ppm)

of the C[8]OCH$_3$ initiator fragment relative to the terminal allyl protons (δ5.00 ppm). The ratio of allyl end groups to the central initiator fragment was 8.0±0.2, in excellent agreement with the expected value of 8.0.

Figure 13:
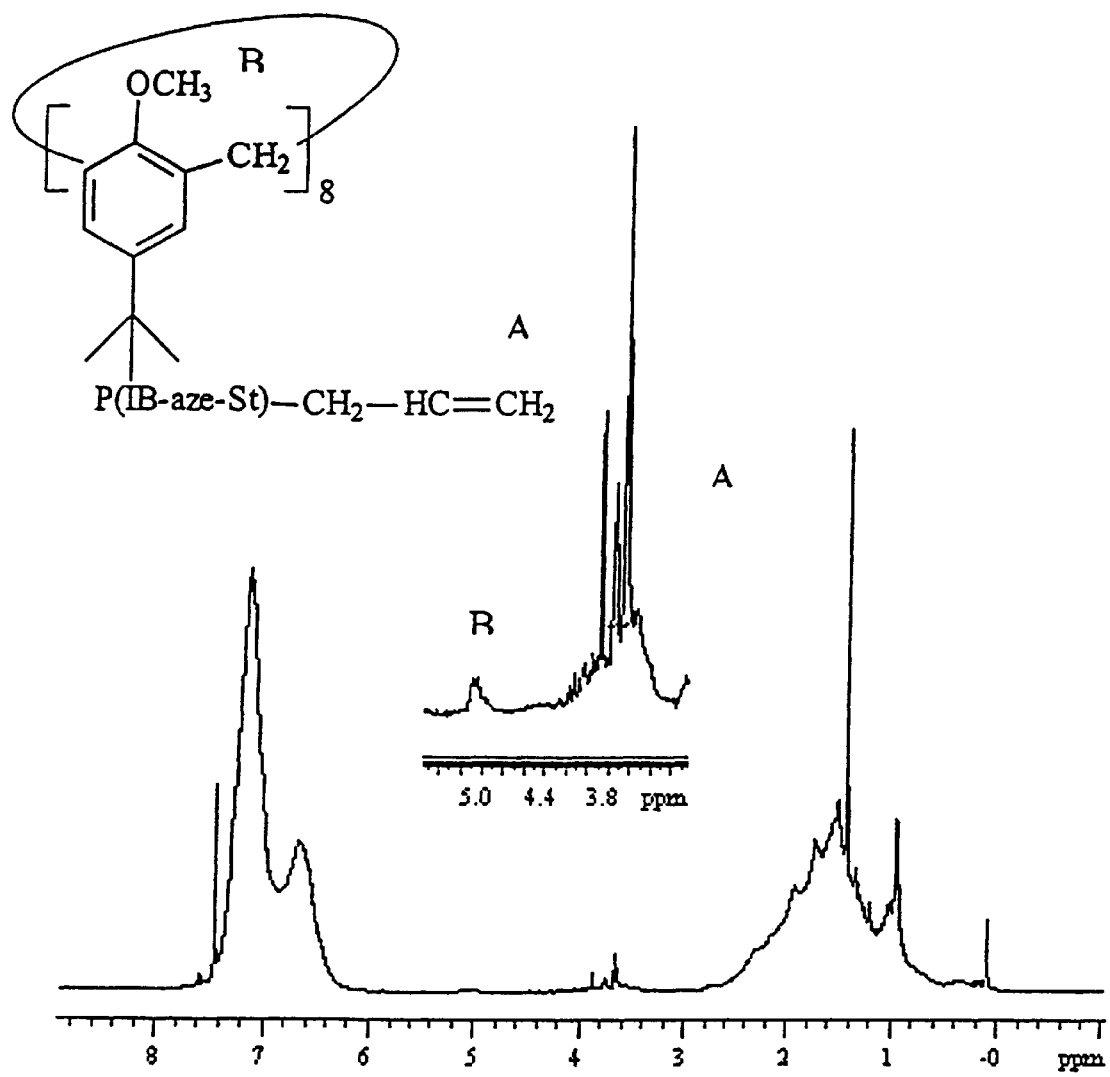
FIG. 13 is a $^1$H NMR spectrum of a representative trimethyl siloxane-terminated poly(isobutylene-aze-styrene) star copolymer.

Subsequently, the allyl end groups of the star were converted to the corresponding alcohol end groups by hydroboration/oxidation. This transformation is essentially quantitation and has often been used to convert allyl terminated PIBs to the alcohol terminated product. The quantitative nature of hydroboration/oxidation in the present instance was proven by converting the —CH$_2$OH termini with —(CH$_3$)$_3$SiCl to —OSi(CH$_3$)$_3$ end groups, followed by quantitative $^1$H NMR analysis. FIG. 13 shows a representative spectrum. Quantization of end functionality was accomplished by integrating the aromatic methoxy protons (δ3.79 ppm) of the C[8]OCH$_3$ initiator fragment relative to the terminal siloxyl methyl protons (δ0.15 ppm). According to this analysis, the ratio of arm end groups to initiator fragment was 8.0±0.3 in excellent agreement with the expected value of 8.0.

According to these investigations, the strategies outlined in Schemes I and II has been implemented and the synthesis of telechelic stars with eight azeotropic IB/St copolymer arms radiating from a calyx[8]arene core has been accomplished.

5. Characterization

Having developed the needed preparative and analytical techniques, we proceeded to prepare suitable quantities of a series of materials for detailed characterization and crosslinking studies. Table IV shows the results of compositional analyses by three independent techniques of a series of calix[8]arene/allyl-termined poly(isobutylene-aze-styrene) copolymer stars. According to the data, within what is considered to be experimental variation and independent of copolymer molecular weights, the IB/St composition of the stars is 21/79 mol/mol, i.e., the azeotropic composition.

TABLE IV

Compositional Analysis of Different Molecular Weights of Calix[8]arene-Allyl-Terminated Poly(isobutylene-aze-styrene) Copolymer

| Mw | F$_{IB}$ (mol % IB) | | |
|---|---|---|---|
| (g/mol) | GPC | FTIR | $^1$H NMR |
| 20,400 | 0.18 | 0.23 | 0.20 |
| 24,900 | 0.19 | 0.22 | 0.21 |
| 30,300 | 0.21 | 0.21 | 0.22 |
| 34,800 | 0.19 | 0.22 | 0.21 |

Table V further summarizes select molecular characteristics of the products shown in Table IV. According to the data in columns 2 and 3, which show molecular weights of the stars calculated and obtained, respectively, the agreement between experimental and expected molecular weights is excellent. Evidently, stars with predictable molecular weights can be made, and the synthesis are controllable.

Column 6 shows the number of star arms calculated from proton NMR data for the allyl-telechelic product and the —OSi(CH$_3$)$_3$ telechelic derivative. The experimental values are 8.0±0.3, i.e., within experimental variation of the theoretical value of 8.0.

Table V also shows the T$_g$'s of the series of stars. Apparently, the T$_g$'s increase from 59.5 to 65° C. with increasing molecular weights from Mw=20,400 to 34,800 g/mol. Such an increase in the Tg with molecular weights can be expected (see above in this respect). The linear azeotropic copolymer exhibited Tg=65° C. when Mw was at about 24,000 g/mol. In contrast, the star with the azeotropic copolymer arms showed Tg=65° C. when Mw was at about 4,300 g/mol, i.e., at a significantly lower arm molecular weight. FIG. 9 compares Tg versus molecular weight data for linear azeotropic IB/St copolymer and their counterpart stars. As evidenced by the data, the Tg of the stars appears to increase much faster than those of the linear polymers with molecular weights. This relatively more rapid rigidification of the stars may be due to the rigid calyx[8]arene core, i.e., to the immobilization of one of the chain ends in the stars.

TABLE V

Molecular Characteristics of Stars with -Allyl and —OSi(CH$_3$)$_3$ Ends

| Endgroup | MW Theor. × 10$^{-3}$ g/mol | MW GPC × 10$^{-3}$ g/mol | Mn, GPC × 10$^{-3}$ g/mol | Mn, arm × 10$^{-3}$ g/mol | PDI | F$_{arms}$, NMR | Tg ° C. |
|---|---|---|---|---|---|---|---|
| -Allyl | 20 | 20.4 | 11.5 | 1.3 | 1.79 | 7.9 | 59.5 |
| —OSi(CH$_3$)$_3$ | | | | | | 8.3 | |
| -Allyl | 26 | 24.9 | 14.9 | 1.7 | 1.67 | 8.2 | 62 |
| —OSi(CH$_3$)$_3$ | | | | | | 7.8 | |
| -Allyl | 32 | 30.3 | 18.4 | 2.2 | 1.65 | 8.3 | 64.5 |
| —OSi(CH$_3$)$_3$ | | | | | | 7.9 | |
| -Allyl | 36 | 34.8 | 22.9 | 1.52 | 1.52 | 7.6 | 65 |
| —OSi(CH$_3$)$_3$ | | | | | | 7.5 | |

Select solution properties of an allyl-telechelic star with Mn=20,400 g/mol (see line 1 in Table V) were determined and compared with a linear IB/St azeotropic copolymer of similar Mn (~25,000 g/mol). Table VI shows the data.

TABLE VI

Solution Characterization of Representative Star

| Product | Mw g/mol | Mark-Houwink-Sakurada Constants (by GPC RI/η/LS) | | [η]$^{30}$$_{THF}$ g/dL | g* [η]$_{star}$ [η]$_{linear}$ |
|---|---|---|---|---|---|
| | | α | K × 10$^{-3}$ | | |
| Star | 20,400 | 0.5 | 4.4 | 0.05 | 0.26 |
| Linear | 25,000 | 0.6 | 3.3 | 0.19 | — |

The Mark-Houwink-Sakurada constant α=0.5 implies that the star is behaving as it were in a Θ solvent, despite that it is in THF. The intrinsic viscosity of the star is significantly lower than that of the linear copolymer, which is in line with the well-known viscosity difference between stars and linear polymers of similar molecular weights. The branching coefficient g*=0.28 gives a measure of the effect of branching on the viscosity contributions of one polymer chain. Compared to similar PIB stars, these copolymer stars exhibit a lesser decrease of viscosity with branching.

6. Crosslinking

The crosslinking of select calix[8]arene-hydroxyl termined poly(isobutylene-aze-styrene) copolymers by diisocyanates was investigated by a well-established procedure. Crosslinking of stars having a weight average molecular weight of about 35,000 g/mol by the use of MDI was essentially complete (sol>2%). Casting of PGDMEA solutions onto aluminum surfaces gave translucent, scratch-resistant flexible films with Shore A hardness of 90. Crosslinking with TDI gave opaque, brittle films with 12% sol indicating incomplete network formation. Shore A hardness was less than 30. Unsatisfactory film formation may be due to the relatively short IB/St arms (Mw of each arm was less than 4,300 g/mol) having insufficient mobility. These films, particularly those obtained with MDI, may be of interest for coating applications. Multi-arm stars with —CH$_2$OH termini could, of course, be also crosslinked by other means and crosslinking agents, e.g., melamines, or after conversion to methacryloyl termini, by free radical techniques.

Thus, it will be appreciated that, in the present invention, the synthesis of well-defined poly(isobutylene-co-styrene) star copolymers is accomplished by the use of one of tert-methoxy, tert-hydroxy, and tert-Cl derivatives of calix[n]arene (n=4 to 16, and preferably 8) as a multifunctional initiator, in conjunction with at least one Freidel-Crafts acid as a co-initiator, to induce the living (carbocationic) polymerization of the comonomers, including isobutylene and one other polymerizable monomer. The polymerization forms statistical star copolymers whose end groups can be converted to crosslinkable end groups such as allyls or hydroxyls.

In a preferred embodiment, the stars comprise a calix[8]arene core out of which radiate eight IB/St azeotropic copolymer arms fitted with the crosslinkable termini. The synthesis generally involves a core-first strategy in which the C[8]OCH$_3$/Friedel Crafts acid initiating system induces the keep cationic polymerization of 21/79 mol/mol IB/St charges followed by endquenching with allyltrimethylsilane. The allyl termini were quantitatively converted to hydroxyl end groups by hydroboration/oxidation. Such a star is shown in Scheme III hereinbelow.

The microstructure of the stars was established by a variety of analytical techniques. Select solution properties of the stars were investigated. The Tg's of the allyl-telechelic stars increase with arm molecular weights and reach a plateau at about 65° C. with molecular weight of the arm being about 4,300 g/mol. Linear azeotropic IB/St copolymers also reach the same plateau at about 65° C. but at much higher molecular weights of about 24,000 g/mol. Stars with hydroxyl termini have been crosslinked with diisocyanates. These materials may be of interest for coating applications and can be used to form a coating.

Based upon the foregoing disclosure, it should now be apparent that the use of the syntheses and characterizations described herein will carry out one or more of the aspects set forth hereinabove for the present invention. It is, therefore, to be understood that any variations evident fall within the scope of the claimed invention and thus, the selection of specific component elements can be determined without departing from the spirit of the invention herein disclosed and described. In particular, statistical copolymers according to the present invention are not necessarily limited to those having azeotropic compositions. Moreover, as noted hereinabove, other means for crosslinking can be substituted for the diisocynate route proposed. Thus, the scope of the invention shall include all modifications and variations that may fall within the scope of the attached claims.

What is claimed is:

1. A star polymer comprising:
   a calix[n]arene core where n=4 to 16; and
   N number of arms of a living statistical copolymer comprising isobutylene and a different, carbocationically copolymerizable monomer selected from the group consisting of styrene and derivatives thereof, and isoprene and derivatives thereof, each arm being connected to the calix[n]arene core, and wherein N=n.

2. The star polymer according to claim 1, wherein the statistical copolymer arms have a glass transition tempera-

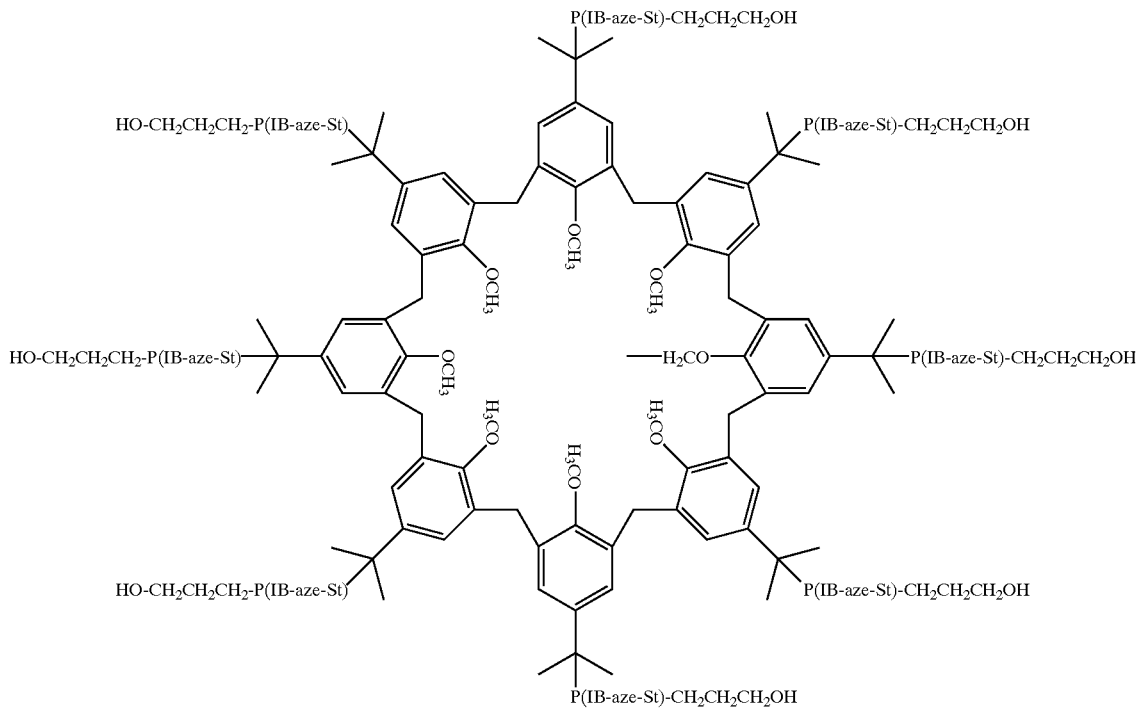

ture between the glass transition temperatures of the polymers formed by the monomers used.

3. The star polymer according to claim 2, wherein the statistical copolymer arms have a glass transition temperature between about −73° C. to about +172° C.

4. The star polymer according to claim 2, wherein the glass transition temperature of the statistical copolymer arms is controlable.

6. The star polymer according to claim 5, wherein the statistical copolymer arms are poly(isobutylene-aze-styrene).

7. The star polymer according to claim 1, wherein n=8.

8. The star polymer according to claim 1, wherein the statistical copolymer arms include termini which are crosslinkable endgroups.

9. The star polymer according to claim 8, wherein the termini of the statistical copolymer arms are selected from the group consisting of allyl and hydroxyl termini.

10. A star polymer comprising:
 a calix[n]arene core where n=4 to 16; and
 N number of arms of a statistical copolymer comprising isobutylene and a different, carbocationically copolymerizable monomer selected from the group consisting of styrene and derivatives thereof, and isoprene and derivatives thereof, wherein the statistical copolymer arms include termini which are crosslinkable endgroups, selected from the group consisting of allyl and hydroxyl termini, each arm being connected to the calix[n]arene core, and wherein N=n.

* * * * *

UNITED STATES PATENT AND TRADEMARK OFFICE
CERTIFICATE OF CORRECTION

PATENT NO. : 6,512,056 B1 Page 1 of 1
DATED : January 28, 2003
INVENTOR(S) : Kennedy et al.

It is certified that error appears in the above-identified patent and that said Letters Patent is hereby corrected as shown below:

Column 25,
Between lines 8 and 9, claim 5 should read as follows:
-- The star polymer according to claim 1, wherein the statistical copolymer arms are poly(isobutylene-*co*-styrene). --

Signed and Sealed this

Twentieth Day of May, 2003

JAMES E. ROGAN
*Director of the United States Patent and Trademark Office*